(12) United States Patent
Song et al.

(10) Patent No.: US 8,307,393 B2
(45) Date of Patent: *Nov. 6, 2012

(54) METHOD OF PROCESSING NON-REAL TIME SERVICE AND BROADCAST RECEIVER

(75) Inventors: Jae Hyung Song, Seoul (KR); Jong Yeul Suh, Seoul (KR); Chang Sik Yun, Anyang-si (KR); Gomer Thomas, Arlington, WA (US); Jun Hui Lee, Seoul (KR); Jin Pil Kim, Seoul (KR); Ho Taek Hong, Seoul (KR); Kwan Suk Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 475 days.

This patent is subject to a terminal disclaimer.

(21) Appl. No.: 12/688,512

(22) Filed: Jan. 15, 2010

(65) Prior Publication Data

US 2010/0186035 A1 Jul. 22, 2010

Related U.S. Application Data

(60) Provisional application No. 61/145,104, filed on Jan. 15, 2009, provisional application No. 61/153,985, filed on Feb. 20, 2009, provisional application No. 61/153,973, filed on Feb. 20, 2009, provisional application No. 61/160,689, filed on Mar. 16, 2009, provisional application No. 61/169,711, filed on Apr. 15, 2009, provisional application No. 61/179,005, filed on May 17, 2009, provisional application No. 61/226,259, filed on Jul. 16, 2009, provisional application No. 61/255,844, filed on Oct. 28, 2009.

(51) Int. Cl.
*G06F 3/00* (2006.01)
*G06F 13/00* (2006.01)
*H04N 5/445* (2006.01)

(52) U.S. Cl. ............................. 725/40; 725/51; 386/241
(58) Field of Classification Search ........................ None
See application file for complete search history.

(56) References Cited

U.S. PATENT DOCUMENTS

| | | | |
|---|---|---|---|
| 2005/0216901 A1* | 9/2005 | Speare et al. | 717/168 |
| 2007/0094346 A1* | 4/2007 | Nussey | 709/217 |
| 2008/0040666 A1* | 2/2008 | Wang et al. | 715/526 |

(Continued)

FOREIGN PATENT DOCUMENTS

KR 10-2002-0080048 10/2002

(Continued)

*Primary Examiner* — Dominic D Saltarelli
*Assistant Examiner* — Jason J Chung
(74) *Attorney, Agent, or Firm* — McKenna Long & Aldridge LLP

(57) ABSTRACT

A method of processing a non-real time service of a broadcast receiver, which receives and processes a service being transmitted in non-real time, and a broadcast receiver are disclosed. Herein, the method of processing a non-real time service of a broadcast receiver includes receiving a signaling information table including additional information on contents configuring a non-real time service and a content identifier for each content, acquiring the additional information on contents and the content identifier for each content from the signaling information table, storing contents being downloaded through a FLUTE or an internet in a storage medium, based upon the additional information on contents and the content identifier for each content, and displaying a list of recordings including the contents stored in the storage medium, wherein a list of recordings screen displaying the list of recordings includes at least one of a content name, a channel name, a date of recording, and a content size.

10 Claims, 24 Drawing Sheets

U.S. PATENT DOCUMENTS

| | | | |
|---|---|---|---|
| 2008/0090513 A1* | 4/2008 | Collins et al. | 455/3.01 |
| 2009/0077247 A1* | 3/2009 | Bouazizi et al. | 709/229 |
| 2009/0265790 A1* | 10/2009 | Takeda et al. | 726/26 |
| 2010/0058421 A1* | 3/2010 | Hastings et al. | 725/116 |
| 2010/0095328 A1* | 4/2010 | Hartung et al. | 725/46 |
| 2010/0238801 A1* | 9/2010 | Smith et al. | 370/229 |
| 2011/0004908 A1* | 1/2011 | Eyer | 725/56 |
| 2011/0004910 A1* | 1/2011 | Eyer | 725/110 |

FOREIGN PATENT DOCUMENTS

| | | |
|---|---|---|
| KR | 10-2005-0042377 | 5/2005 |
| WO | WO 2006/030309 | 3/2006 |
| WO | WO 2008/084441 | 7/2008 |

* cited by examiner

FIG. 4

| Syntax | No. of Bits | Format |
|---|---|---|
| virtual_channel_table_section(){ | | |
|   table_id | 8 | 0xC8 |
|   section_syntax_indicator | 1 | '1' |
|   Private_indicator | 1 | '1' |
|   reserved | 2 | '11' |
|   section_length | 12 | uimsbf |
|   transport_stream_id | 16 | uimsbf |
|   reserved | 2 | '11' |
|   version_number | 5 | uimsbf |
|   current_next_indicator | 1 | bslbf |
|   section_number | 8 | uimsbf |
|   last_section_number | 8 | uimsbf |
|   protocol_version | 8 | uimsbf |
|   num_channels_in_section | 8 | uimsbf |
|   for(i=0;i<num_channels_in_section;i++){ | | |
|     short_name | 7*16 | uimsbf |
|     reserved | 4 | '1111' |
|     major_channel_number | 10 | uimsbf |
|     minor_channel_number | 10 | uimsbf |
|     modulation_mode | 8 | uimsbf |
|     carrier_frequency | 32 | uimsbf |
|     channel_TSID | 16 | uimsbf |
|     program_number | 16 | uimsbf |
|     ETM_location | 2 | uimsbf |
|     access_controlled | 1 | bslbf |
|     hidden | 1 | bslbf |
|     reserved | 2 | '11' |
|     hide_guide | 1 | bslbf |
|     reserved | 3 | '111' |
|     service_type | 6 | uimsbf |
|     source_id | 16 | uimsbf |
|     reserved | 6 | '111111' |
|     descriptors_length | 10 | uimsbf |
|     for(i=0;i<N;i++){ | | |
|       descriptor() | | |
|     } | | |
|   } | | |
|   reserved | 6 | '111111' |
|   additional_descriptors_length | 10 | uimsbf |
|   for(j=0;j<N;j++){ | | |
|     additional_descriptor() | | |
|   } | | |
|   CRC_32 | 32 | rpchof |
| } | | |

FIG. 5

| service_type Meaning | |
|---|---|
| 0x00 | [Reserved] |
| 0x01 | Analog_television - The virtual channel carries analog television programming |
| 0x02 | ATSC_digital_television - The virtual channel carries television programming (audio, video and optional associated data) conforming to ATSC standards |
| 0x03 | ATSC_audio - The virtual channel carries audio programming (audio service and optional associated data) conforming to ATSC standards |
| 0x04 | ATSC_data_only_service - The virtual channel carries a data service conforming to ATSC standards, but no video of stream_type 0x02 or audio of stream_type 0x81 |
| 0x05-0x3F | [Reserved for future ATSC use] |

FIG. 6

| Value | Meaning |
|---|---|
| 0x00 | [Reserved] |
| 0x01 | analog_television - The virtual channel carries analog television programming |
| 0x02 | ATSC_digital_television - The virtual channel carries television programming (audio, video and optional data) conforming to ATSC standards |
| 0x03 | ATSC_audio - The virtual channel carries audio programming (audio service and optional data) conforming to ATSC standards |
| 0x04 | ATSC_data_only_service - The virtual channel carries a data service conforming to ATSC standards, but no video of stream_type 0x02 or audio of stream_type 0x81 |
| 0x05 | Software Download Data Service – see A/97 |
| 0x06 | Unassociated/small screen service – see A/65C Amendment 1 |
| 0x07 | Parameterized Service – New A/V CODEC |
| 0x08 | ATSC_nrt_service — The virtual channel carries a NRT service conforming to ATSC standards |
| 0x09-0x7F | [ Reserved for future ] |
| 0x80-0xFF | [ User Private ] |

FIG. 7

| Syntax | No. of Bits | Format |
|---|---|---|
| data_service_table_bytes() { | | |
|    sdf_protocol_version | 8 | uimsbf |
|    application_count_in_section | 8 | uimsbf |
|    if(application_count_in_section > 0) { | | |
|       for(j = 0; j <application_count_in_section; j++) { | | |
|          compatibility_descriptor() | | |
|          app_id_byte_length | 16 | uimsbf |
|          if(app_id_byte_length > 1) { | | |
|             app_id_description | 16 | uimsbf |
|             for(i=0;i<app_id_byte_length-2;i++) { | | |
|                app_id_byte | 8 | bslbf |
|             } | | |
|          } | | |
|          tap_count | 8 | uimsbf |
|          for(i=0;i<tap_count; i++) { | | |
|             protocol_encapsulation | 8 | uimsbf |
|             action_type | 7 | uimsbf |
|             resource_location | 1 | bslbf |
|             Tap() | | |
|             tap_info_length | 16 | uimsbf |
|             for(k=0; k<N; k++) { | | |
|                descriptor() | | |
|             } | | |
|          } | | |
|          app_info_length | 16 | uimsbf |
|          for(i=0; i<M; i++) { | | |
|             descriptor() | | |
|          } | | |
|          app_data_length | 16 | uimsbf |
|          for(i=0; i<app_data_length; i++) { | | |
|             app_data_byte | 8 | bslbf |
|          } | | |
|       } | | |
|    } | | |
|    service_info_length | 16 | uimsbf |
|    for(j=0; j<K; j++) { | | |
|       descriptor() | | |
|    } | | |
|    service_private_data_length | 16 | uimsbf |
|    for(j=0; j<service_private_data_length; j++){ | | |
|       service_private_data_byte | 8 | bslbf |
|    } | | |
| } | | |

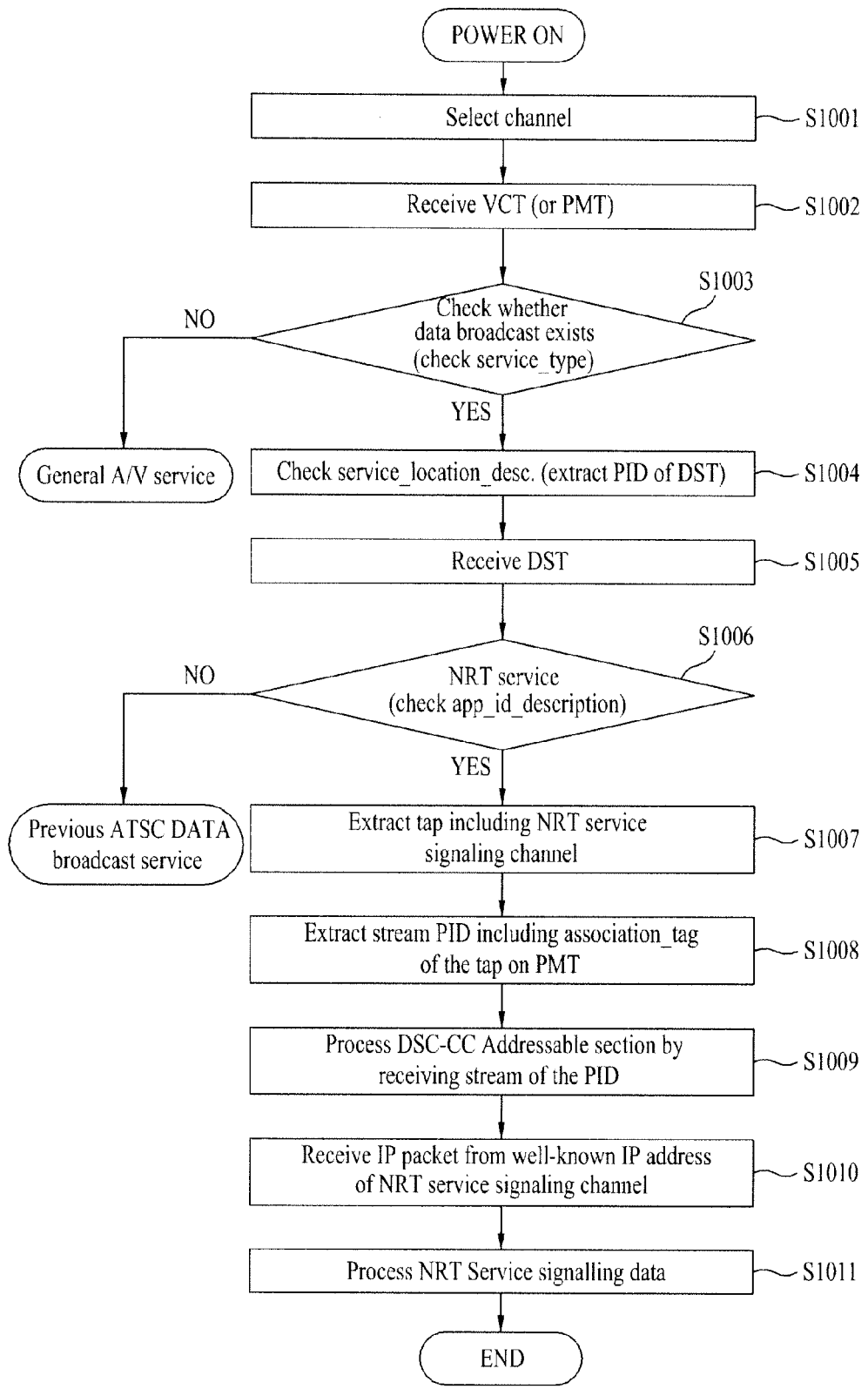

FIG. 10

| Syntax | No. of Bits | Format |
|---|---|---|
| NRT_service_table_section() { | | |
|     table_id | 8 | 0xDB |
|     section_syntax_indicator | 1 | '0' |
|     private_indicator | 1 | '1' |
|     reserved | 2 | '11' |
|     section_length | 12 | uimsbf |
|     table_id_extension { | | |
|         NST_protocol_version | 8 | uimsbf |
|         reserved | 8 | '11111111' |
|     } | | |
|     reserved | 2 | '11' |
|     version_number | 5 | uimsbf |
|     current_next_indicator | 1 | bslbf |
|     section_number | 8 | uimsbf |
|     last_section_number | 8 | uimsbf |
|     num_NRT_services | 8 | uimsbf |
|     for (j=0;j< num_NRT_services; j++) | | |
|     { | | |
|         NRT_service_id | 16 | uimsbf |
|         reserved | 2 | '11' |
|         NRT_service_status | 2 | uimsbf |
|         SP_indicator | 1 | bslbf |
|         short_NRT_service_name_length /* m */ | 3 | uimsbf |
|         short_NRT_service_name | 16*m | |
|         reserved | 2 | '11' |
|         NRT_service_category | 6 | uimsbf |
|         num_components | 5 | uimsbf |
|         IP_version_flag | 1 | bslbf |
|         source_IP_address_flag | 1 | bslbf |
|         NRT_service_destination_IP_address_flag | 1 | bslbf |
|         if (source_IP_address_flag) | | |
|             source_IP_address | 32 or 128 | uimsbf |
|         if (NRT_service_destination_IP_address_flag) | | |
|             NRT_service_destination_IP_address | 32 or 128 | uimsbf |
|         for (j=0;j< num_components; j++) | | |
|         { | | |
|             reserved | 1 | '1' |
|             essential_component_indicator | 1 | bslbf |
|             component_destination_IP_address_flag | 1 | bslbf |
|             port_num_count | 5 | uimsbf |
|             component_destination_UDP_port_num | 16 | uimsbf |
|             if (component_destination_IP_address_flag) | | |
|                 component_destination_IP_address | 32 or 128 | uimsbf |
|             reserved | 4 | '1111' |

FIG. 11

| | | |
|---|---|---|
| num_component_level_descriptors | 4 | uimsbf |
| for (k=0;k< num_components_level_descriptors; k++) | | |
| { | | |
|     component_level_descriptor() | var | |
| } | | |
| } | | |
| reserved | 4 | '1111' |
| num_NRT_service_level_descriptors | 4 | uimsbf |
| for (m=0; m<num_NRT_service_level_descriptors; m++) | | |
| { | | |
|     NRT_service_level_descriptor() | var | |
| } | | |
| } | | |
| reserved | 4 | '1111' |
| num_virtual_channel_level_descriptors | 4 | uimsbf |
| for (n=0; n<num_virtual_channel_level_descriptors; n++) { | | |
| { | | |
|     virtual_channel_level_descriptor() | var | |
| } | | |
| } | | |

FIG. 12

| Syntax | No.of Bits | Format |
|---|---|---|
| NRT_component_descriptor() { | | |
|     descriptor_tag | 8 | 0 x CB |
|     descriptor_length | 8 | uimsbf |
|     component_type | 7 | uimsbf |
|     component_encryption_flag | 1 | |
|     if (component_encryption_flag == '1') { | | |
|         num_STKM_streams | 8 | uimsbf |
|         for (i=0; i<num_STKM_streams; i++) { | | |
|             STKM_stream_id | 8 | uimsbf |
|         } | | |
|     NRT_component_data(component_type) | var | |
| } | | |

FIG. 13

| Syntax | No.of Bits | Format |
|---|---|---|
| NRT_component_data() { | | |
|   TSI | 16 | uimsbf |
|   session_start_time | 32 | uimsbf |
|   session_end_time | 32 | uimsbf |
|   reserved | 5 | '11111' |
|   tias_bandwidth_indicator | 1 | bslbf |
|   as_bandwidth_indicator | 1 | bslbf |
|   FEC_OTI_indicator | 1 | bslbf |
|   if (tias_bandwidth_indicator == '1') { | | |
|     tias_bandwidth | 16 | uimsbf |
|   } | | |
|   if (as_bandwidth_indicator == '1') { | | |
|     as_bandwidth | 16 | uimsbf |
|   } | | |
|   if (FEC_OTI_indicator == '1') { | | |
|     FEC_encoding_id | 8 | uimsbf |
|     FEC_instance_id | 16 | uimsbf |
|   } | | |
| } | | |

FIG. 14

| Syntax | No. of Bits | Format |
|---|---|---|
| NRT_information_table_section() { | | |
| table_id | 8 | 0xTBD |
| section_syntax_indicator | 1 | '1' |
| private_indicator | 1 | '1' |
| reserved | 2 | '11' |
| section_length | 12 | uimsbf |
| service_id | 16 | uimsbf |
| reserved | 2 | '11' |
| NRT_IT_version_number | 5 | uimsbf |
| current_next_indicator | 1 | '1' |
| section_number | 8 | uimsbf |
| last_section_number | 8 | uimsbf |
| protocol_version | 8 | uimsbf |
| time_span_start | 32 | uimsbf |
| reserved | 5 | '11111' |
| time_span_length | 11 | uimsbf |
| num_items_in_section | 8 | uimsbf |
| for (j=0; j< num_items_in_section; j++) { | | |
|   content_linkage | 32 | uimsbf |
|   updates_available | 1 | bslbf |
|   TF_available | 1 | bslbf |
|   available_on_internet | 1 | bslbf |
|   low_latency | 1 | bslbf |
|   playback_length_in_seconds | 20 | uimsbf |
|   content_length_included | 1 | bslbf |
|   playback_delay_included | 1 | bslbf |
|   expiration_included | 1 | bslbf |
|   reserved | 1 | '1' |
|   duration | 12 | uimsbf |

FIG. 15

| | | |
|---|---|---|
| if (content_length_included==1) { | | |
|     content_length | 40 | uimsbf |
| } | | |
| if (playback_delay_included==1) { | | |
|     reserved | 4 | '1111' |
|     playback_delay | 20 | uimsbf |
| } | | |
| if (expiration_included==1) { | | |
|     expiration | 32 | uimsbf |
| } | | |
| content_name_length | 8 | uimsbf |
| content_name_text() | var | |
| reserved | 4 | '1111' |
| content_descriptors_length | 12 | uimsbf |
| for (i=0; i<N; i++) { | | |
|     content_descriptor() | | |
| } | | |
| } | | |
| reserved | 6 | '111111' |
| descriptors_length | 10 | uimsbf |
| for (i=0; i<M; i++) { | | |
|     descriptor() | | |
| } | | |
| } | | |

FIG. 16

```
<?xml version="1.0" encoding="UTF-8"?>
<xs:schema xmlns=" http://www.atsc.org/XMLSchemas/nrt/flute/fdt/1.0"
xmlns:xs="http://www.w3.org/2001/XMLSchema" targetNamespace =
"http://www.atsc.org/XMLSchemas/nrt/flute/fdt/1.0" elementFormDefault="qualified">
  <xs:element name="FDI-Instance" type="FDT-InstanceType"/>
  <xs:complexType name="FDT-InstanceType">
    <xs:sequence>
      <xs:element name="File" type="File-Type" maxOccurs="unbounded"/>    ①
      <xs:element name="FDT-Content-Linkage" type="Content-Linkage-Type" minOccurs="0" maxOccurs="unbounded"/>
      <xs:any namespace="##other" processContents="skip" minOccurs="0" maxOccurs="unbounded"/>
    </xs:sequence>
    <xs:attribute name="Expires" type="xs:string" use="required"/>
    <xs:attribute name="Complete" type="xs:boolean" use="optional"/>
    <xs:attribute name="Content-Type" type="xs:string" use="optional"/>
    <xs:attribute name="Content-Encoding" type="xs:string" use="optional"/>
    <xs:attribute name="FEC-OTI-FEC-Encoding-ID" type="xs:unsignedLong" use="optional"/>
    <xs:attribute name="FEC-OTI-FEC-Instance-ID" type="xs:unsignedLong" use="optional"/>
    <xs:attribute name="FEC-OTI-Maximum-Source-Block-Length" type="xs:unsignedLong" use="optional"/>
    <xs:attribute name="FEC-OTI-Encoding-Symbol-Length" type="xs:unsignedLong" use="optional"/>
    <xs:attribute name="FEC-OTI-Max-Number-of-Encoding-Symbols" type="xs:unsignedLong" use="optional"/>
    <xs:attribute name="FEC-OTI-Scheme-Specific-Info" type="xs:base64Binary" use="optional"/>
    <xs:anyAttribute processContents="skip"/>
  </xs:complexType>
  <xs:complexType name="File-Type">
    <xs:sequence>
      <xs:element name="File-Content-Linkage" type="Content-Linkage-Type" minOccurs="0" maxOccurs="unbounded"/>    ②
      <xs:any namespace="##other" processContents="skip" minOccurs="0" maxOccurs="unbounded"/>
    </xs:sequence>
```

FIG. 17

```
<xs:attribute name="Content-Location" type="xs:anyURI" use="required"/>   (4)
<xs:attribute name="TOI" type="xs:positiveInteger" use="required"/>
<xs:attribute name="Content-Length" type="xs:unsignedLong" use="required"/>
<xs:attribute name="Transfer-Length" type="xs:unsignedLong" use="optional"/>
<xs:attribute name="Content-Type" type="xs:string" use="optional"/>
<xs:attribute name="Content-Encoding" type="xs:string" use="optional"/>
<xs:attribute name="Content-MD5" type="xs:base64Binary" use="optional"/>
<xs:attribute name="FEC-OTI-FEC-Encoding-ID" type="xs:unsignedLong" use="optional"/>
<xs:attribute name="FEC-OTI-FEC-Instance-ID" type="xs:unsignedLong" use="optional"/>
<xs:attribute name="FEC-OTI-Maximum-Source-Block-Length" type="xs:unsignedLong" use="optional"/>
<xs:attribute name="FEC-OTI-Encoding-Symbol-Length" type="xs:unsignedLong" use="optional"/>
<xs:attribute name="FEC-OTI-Max-Number-of-Encoding-Symbols" type="xs:unsignedLong" use="optional"/>
<xs:attribute name="FEC-OTI-Scheme-Specific-Info" type="xs:base64Binary" use="optional"/>
<xs:anyAttribute processContents="skip"/>
</xs:complexType>
<xs:complexType name="Content-Linkage-Type">
<xs:simpleContent>
<xs:extension base="xs:unsignedInt">
    <xs:attribute name="entry" type="xs:boolean" use="optional" default="false"/>   (3)
    <xs:anyAttribute processContents="skip"/>
</xs:extension>
</xs:simpleContent>
</xs:complexType>
</xs:schema>
```

FIG. 18

| STORAGE MEDIUM MANAGEMENT | |
|---|---|
| Total | 35 GB |
| Operator usage | 0.1 GB |
| NRT contents | 10 GB |
| PVR contents | 15 GB |
| Web contents | 9.9 GB |

Current selection-OPERATOR USAGE

Used by service provider for advertisement and management purposes

Minimum 0.1 GB is required

△ Up     ▽ Down     ◎ Change quota

FIG. 19

| User preference configuration | | |
|---|---|---|
| Gender | Male | |
| Age | 20 ~ 30 | ⊙ Drama |
| Location | Seoul, Korea | ⊙ Documentary |
| Genre | | ⊙ News |
| Hobby | Camera | ● Sports |
| Delete contents if older than | 18 Months | ⊙ Show |
| | | ⊙ Comedy |

⊙ Baseball
● Soccer
⊙ Basketball
⊙ Golf
⊙ Bowling

△ ▽ ◁ ▷  Move     ⊚ Modify / Select

FIG. 20

| Simple Guide | | VIEW PREVIOUS PROGRAM | |
|---|---|---|---|
| | 06:00 | 08:00 | 10:00 |
| SBS | MY WIFE IS BACK | SBS 8 NEWS | SBS SPORTS NEWS |
| KBS | 6:00 HOMETOWN REPORT | THE WORLD WE LIVE IN | KBS NEWS NETWORK |
| EBS | MAGIC PRINCESS SALLY | ON OUR OWN | EBS NEWS |
| MBC | MBC NEWS | ZERO COMPLAINT | ☺ JUNIOR SOCCER |

FIG. 21

| Simple Guide | | | VIEW CURRENT PROGRAM |
|---|---|---|---|
| Drama | HEROES EPISODE 5 | THE GREAT QUEEN SEONDEOK | ☺ PROFESSIONAL BASEBALL |
| | Trauma | Tavis Smiley | |
| News | WORLD NEWS | WORLD FOCUS | Nightly Business Report |
| | Dateline NBC | | HEROES EPISODE 5 |
| Show | SCIENCE CONCERT | The | PLAY NOW (SDTV) |
| | | | SCHEDULE ADVANCE RECORDING (HDTV) |
| HEROES EPISODE 5   2009.12.01 PM 8:00 | | | |
| Three familes celebrate Thanks giving. Peter and Nathan force Angela to tell them the truth about Nathan's death... | | | |

FIG. 22

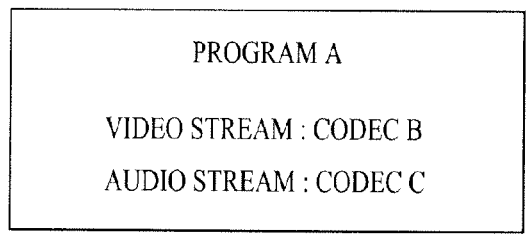

FIG. 23

The video codec does not exist, and
Program A cannot be played.

FIG. 24

The video codec does not exist, and
Program A cannot be played.
Do you wish to download the required
video codec?

| YES | NO |

FIG. 25

LIST OF RECORDINGS

| Content Name | Channel | Date | Size |
|---|---|---|---|
| ☑ Content 2 | MBC | 2009-01-02 | 3.1 MB |
| ☐ Content 3 | KBS | 2009-02-05 | 6.5 MB |
| ☑ Content 4 | SBS | 2009-03-01 | 7 MB |
| ☐ Content 5 | KBS | 2009-04-05 | 10 MB |
| ☑ Content 6 | EBS | 2009-05-05 | 2.5 MB |

△ Up   ▽ Down   ◎ View Details   ⊘ Delete   ○ Copy

Press '1' to sort by content name, '2' to sort by channel name, '3' to sort by date of recording, or '4' to sort by size

FIG. 26

LIST OF RECORDINGS

| KBS | MBC | SBS | EBS |

| Content Name | Date | Size |
|---|---|---|
| ☐ Content 3 | 2009-02-05 | 6.5 MB |
| ☐ Content 5 | 2009-04-05 | 10 MB |
|  |  |  |
|  |  |  |

△▽ Up / Down   ◁▷ Other list   ◎ View Details   ⊘ Delete   ○ Copy

Press '1' to sort by content name, press '2' to sort by date of recording, press '3' to sort by size

METHOD OF PROCESSING NON-REAL TIME SERVICE AND BROADCAST RECEIVER

This application claims the benefit of U.S. Provisional Patent Application No. 61/145,104, filed on Jan. 15, 2009, U.S. Provisional Patent Application No. 61/153,985, filed on Feb. 20, 2009, U.S. Provisional Application No. 61/153,973 filed on Feb. 20, 2009, U.S. Provisional Application No. 61/160,689 filed on Mar. 16, 2009, U.S. Provisional Application No. 61/169,711 filed on Apr. 15, 2009, U.S. Provisional Application No. 61/179,005 filed on May 17, 2009, U.S. Provisional Application No. 61/226,259 filed on Jul. 16, 2009, U.S. Provisional Application No. 61/255,844 filed on Oct. 28, 2009, which are hereby incorporated by reference as if fully set forth herein.

BACKGROUND OF THE INVENTION

1. The Field

The present disclosure relates to a method for processing non-real time service and broadcast receiver thereof.

2. Description of the Related Art

A digital television (DTV) can not only provide video and audio services which are conventional TV services, but can now also provide various other services. For example, the DTV can provide an Electronic Program Guide (EPG) or the like to the user and can simultaneously provide broadcast services received through 2 or more channels. Especially, the number of services that a reception system can provide has been significantly increased since the reception system has been equipped with a large-capacity storage device and has been connected to the Internet or data communication channels which enable bidirectional communication.

SUMMARY OF THE INVENTION

An object of the present invention is to provide a method of receiving and processing non-real time services and a broadcast receiver.

Another object of the present invention is to provide a method of managing a storage medium storing non-real time services and a broadcast receiver.

A further object of the present invention is to provide a method of indicating non-real time services stored in the storage medium and a broadcast receiver.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of processing a non-real time service of a broadcast receiver includes receiving a signaling information table including additional information on contents configuring a non-real time service and a content identifier for each content, acquiring the additional information on contents and the content identifier for each content from the signaling information table, storing contents being downloaded through a FLUTE or an internet in a storage medium, based upon the additional information on contents and the content identifier for each content, and displaying a list of recordings including the contents stored in the storage medium, wherein a list of recordings screen displaying the list of recordings includes at least one of a content name, a channel name, a date of recording, and a content size.

Herein, the contents stored in the storage medium may be categorized as operator contents being managed by a service provider and user contents being managed by a user.

The method further includes allocating a storage space for the operator contents in the storage medium. Herein, a minimum storage space for the operator contents may be predetermined, and the storage space for the operator contents within the storage medium may be allocated to be larger than the predetermined minimum storage space. Also, the operator contents may not be deleted by the user.

The method further includes setting-up user preference conditions including at least one of gender, age, location, genre, hobby, and preservation period, and downloading a content satisfying the user preference conditions through at least one of the FLUTE and the internet, thereby storing the downloaded content in the storage medium. Herein, the contents of the list of recordings screen may be sorted based upon at least of the content name, the channel name, the date of recording, and the content size, so as to be displayed.

When detailed information on a specific content is requested from the list of recordings screen, a detailed information screen including at least one of a content name, a channel name, date and size information related to the content, image information, and text information may be displayed. Herein, the detailed information screen may include an Add Memo button, wherein comments on the content may be inputted by the user when the Add Memo button is selected, and wherein the comment (or memo) on the content inputted (or added) by the user may be displayed as text information. Also, the detailed information screen may include a Protect button, wherein a protect function may be activated on the content when the Protect button is selected, and wherein the protected content may not be deleted upon an en bloc deletion request made by the user.

In another aspect of the present invention, a broadcast receiver includes a tuner and a service manager. Herein, the tuner receives a signaling information table including additional information on contents configuring a non-real time service and a content identifier for each content. And, the service manager acquires the additional information on contents and the content identifier for each content from the signaling information table. Herein, the service manager may store contents being downloaded through a FLUTE or an internet in a storage medium, based upon the additional information on contents and the content identifier for each content, and may display a list of recordings including the contents stored in the storage medium, wherein a list of recordings screen displaying the list of recordings includes at least one of a content name, a channel name, a date of recording, and a content size.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 4 illustrates an embodiment of a bitstream syntax structure of a virtual channel table according to the present invention;

FIG. 5 illustrates an embodiment of service type field values in the virtual channel table of FIG. 4 and respective meanings of the values;

FIG. 6 illustrates another embodiment of values allocated to a service type field in the virtual channel table of FIG. 4 and respective meanings of the values;

FIG. 7 illustrates an embodiment of a bitstream syntax structure of a data service table (DST) of the present invention;

FIG. 9 is a flowchart illustrating a procedure for obtaining access information of an IP stream that carries an NRT service signaling channel using a PSI/PSIP table according to an embodiment of the present invention;

FIG. 10 and FIG. 11 illustrate a bitstream syntax structure of a Non-Real Time Service Table (NST) according to the present invention;

FIG. 12 illustrates a bitstream syntax structure of a component_descriptor( ) according to an embodiment of the present invention;

FIG. 13 illustrates a bitstream syntax of FLUTE file delivery data using the component_descriptor( );

FIG. 14 and FIG. 15 illustrate a bitstream syntax structure of a Non-Real Time Information Table (NRT-IT) according to an embodiment of the present invention;

FIG. 16 and FIG. 17 illustrate an exemplary FDT XML (eXtensible Markup Language) schema according to the present invention;

FIG. 18 illustrates an exemplary storage medium management screen;

FIG. 19 illustrates an exemplary user reference configuration screen according to the present invention;

FIG. 20 illustrates a RT-specific service guide screen according to an embodiment of the present invention;

FIG. 21 illustrates an exemplary NRT service guide screen, which can be shifted from the RT-specific service guide screen;

FIG. 22 to FIG. 24 illustrates examples for displaying codec information of a program according to the present invention in message formats;

FIG. 25 and FIG. 26 respectively illustrate list of recordings according to embodiments of the present invention;

DETAILED DESCRIPTION OF THE INVENTION

Figure 1:
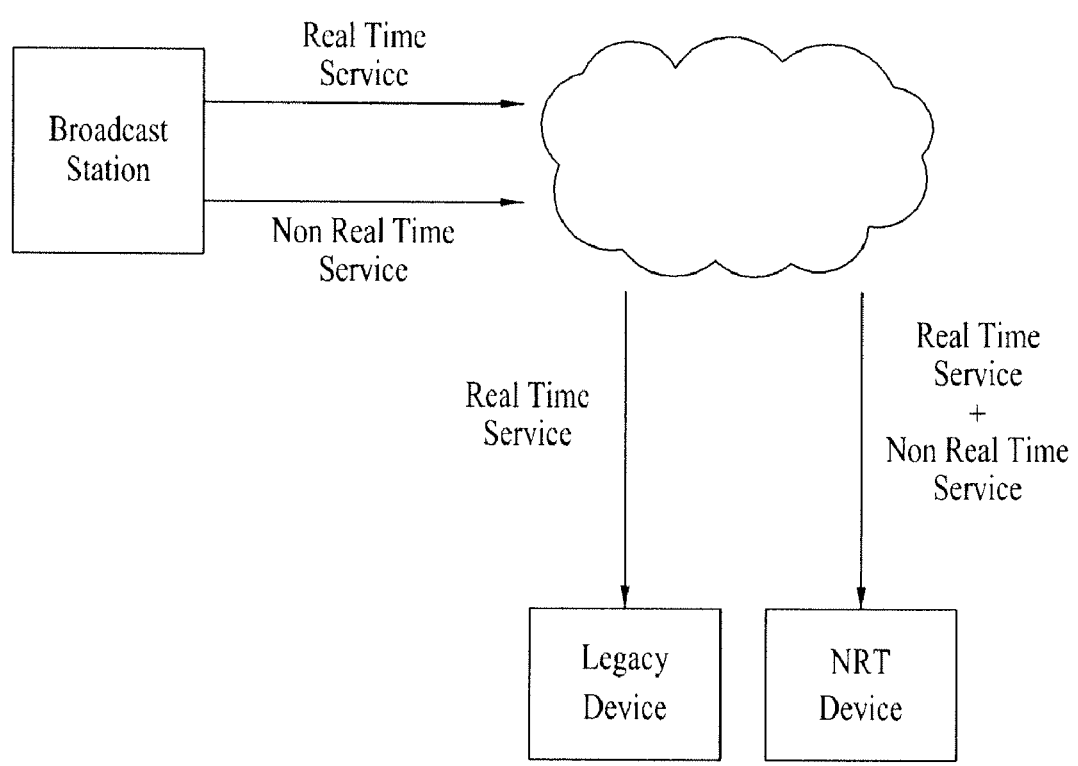
FIG. 1 illustrates a conceptual diagram of providing a real-time (RT) service and a non-real time (NRT) service.

Preferred embodiments of the invention, which can achieve the above objects, will now be described with reference to the accompanying drawings. The configuration and operation of the invention, illustrated in the drawings and described below with reference to the drawings, will be described using at least one embodiment without limiting the spirit and the essential configuration and operation of the invention.

Although most terms of elements in the present invention have been selected from general ones widely used in the art taking into consideration their functions in the invention, the terms may be changed depending on the intention or convention of those skilled in the art or the introduction of new technology. Some terms have been arbitrarily selected by the applicant and their meanings are explained in detail in the following description as needed. Thus, the definitions of the terms used in the invention should be determined based on the whole content of this specification together with the intended meanings of the terms rather than their simple names or meanings.

The term real time (RT) service used in the present invention actually means the real-time service. In other words, it is restricted in time. On the other hand, non-real time (NRT) service refers to non-real time, not RT, service. Thus, NRT service is not restricted in time. Further the data used in NRT service is referred to as NRT service data.

A broadcast receiver according to the present invention receives NRT service through terrestrial, cable, internet, and the like.

The NRT service is stored in a storage medium of the broadcast receiver and then it is displayed through a display according to a time specified by the user or at the user's request. The NRT service is received and stored in a file format according to an embodiment. In an embodiment, the storage medium is an internal HDD attached to the inner part of the broadcast receiver. In another embodiment, the storage medium may be Universal Serial Bus (USB) memory or an external HDD connected externally with the broadcast receiver.

In order to receive and store the files configuring the NRT service and provide service to the user, signaling information is needed. The signaling information is referred to NRT service signaling information or NRT service signaling data according to the present invention.

According to the method of receiving IP datagram, NRT service can be divided into Fixed NRT service and Mobile NRT service. More specifically, the Fixed NRT service is provided through fixed broadcast receiver, and Mobile NRT service is provided through mobile broadcast receiver.

According to an embodiment of the present invention, Fixed NRT service is explained in detail. However, the present invention can also be obviously applied to Mobile NRT service as well.

FIG. 1 illustrates a conceptual diagram of how a RT and an NRT service are provided.

The broadcast station, following the conventional method, transmits the current terrestrial broadcast (or mobile broadcast) RT service. At this juncture, the broadcast station may provide NRT service using the extra bandwidth or a specific bandwidth left after sending the RT service. Thus, RT service and NRT service are transmitted through a same or a different channel. Therefore, a broadcast receiver can be divided into RT service and NRT service, and in order to provide the user with the NRT service when needed, NRT service signaling information (or NRT service signaling data) is required. The NRT service signaling information (or NRT service signaling data) will be described below in detail.

For example, a broadcast station can transmit broadcast service data in real time and transmit news clips, weather information, advertisements, push VOD, or the like in non-real time. The NRT service may not only provide such news clips, weather information, advertisements, and push VOD, but may also provide specific scenes, detailed information on specific program, preview (trailer) from a real-time broadcast service.

A conventional broadcast receiver (i.e., a legacy device) can receive and process RT services but cannot receive and process NRT services. Thus, it is a principle that the process of the conventional broadcast receiver (i.e., a legacy device) is not affected by NRT stream included in the transmission of RT service. In other words, the conventional broadcast receiver does not have a method of handling the NRT service even if it is received.

However, the broadcast receiver (i.e., an NRT device) according to an embodiment of the present invention can combine NRT services and RT services to provide a variety of services to the user compared to the convention receiver.

Figure 2:
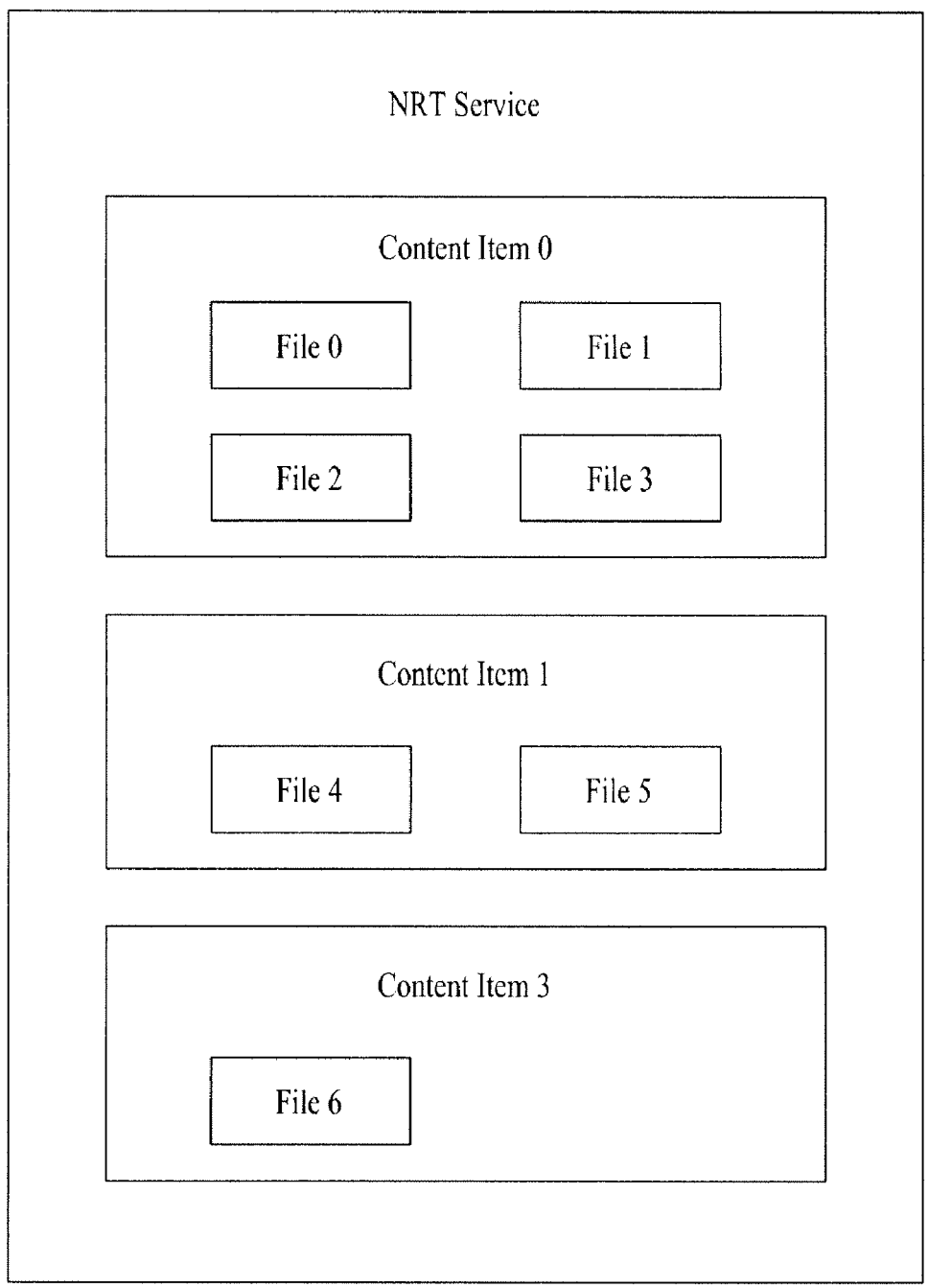
FIG. 2 is a diagram illustrating the relationship between an NRT service, content item, and files.

In an embodiment, one NRT service according to the present invention includes one or more content item (or content or NRT content) and one content item includes one or more files as shown in FIG. 2. The terms "file" and "object" have the same meaning in the description of the present invention.

The content item is the minimum unit that can be presented independently. For example, when a news program, which includes an economic news section, a political news section, and a life news section, is provided in non-real time, the news program may be an NRT service and each of the economic news section, the political news section, and the life news section may be the content item. And each of the economic news section, the political news section, and the life news section may include at least one file.

The NRT service can be transmitted in an MPEG-2 Transport Stream (TS) packet format through a dedicated broadcast channel or the same broadcast channel as the RT service. In this case, a unique PID is transmitted after being allocated to a TS packet of the NRT service data in order to identify the NRT service. In an embodiment of the present invention, IP-based NRT service data is packetized into an MPEG-2 TS packet for transmission.

The NRT service signaling data required to receive the NRT service data is transmitted through an NRT service signaling channel. The NRT service signaling channel is transmitted through a specific IP stream in the IP layer. Here, the IP stream is also packetized into an MPEG-2 TS packet for transmission. The NRT service signaling data transmitted through an NRT service signaling channel includes NRT Service Map Table (NST) and NRT Information Table (NRT-IT). In an embodiment of the present invention, the NST provides the access information of at least one NRT service and at least one content item/file that forms NRT services that operate in the IP layer. In one embodiment of the present invention, NRT-IT provides detailed information of the content item/file that forms NRT service. In the present invention, the NST and the NRT-IT may be referred to as Signaling Information Table.

Figure 3:
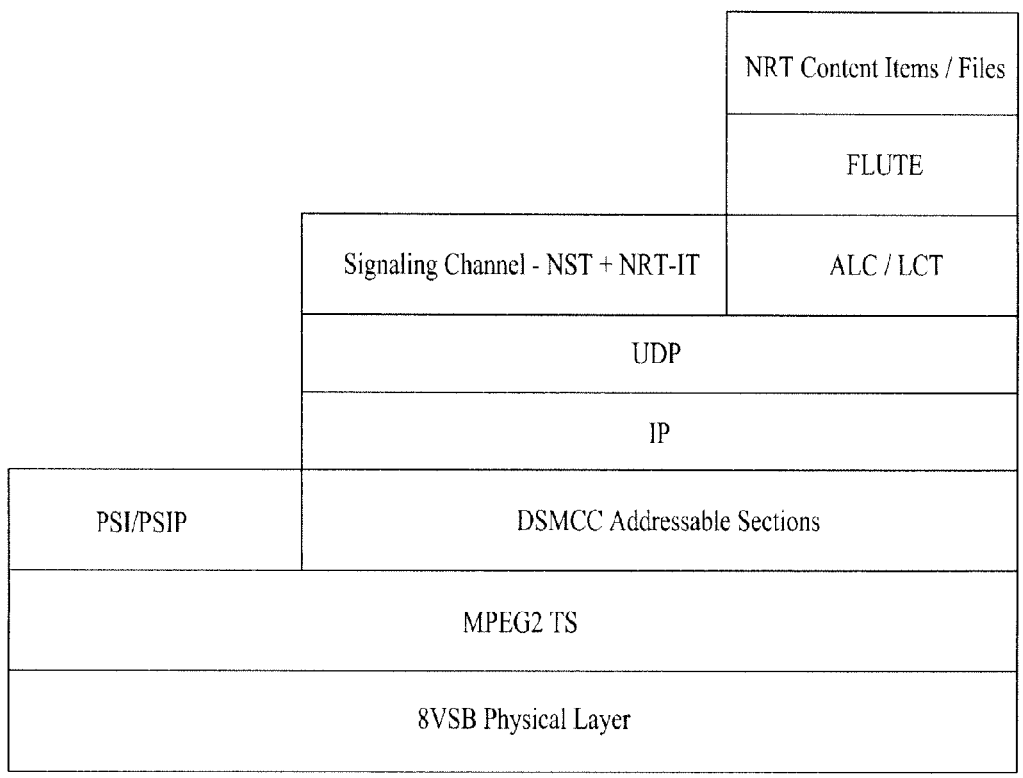
FIG. 3 illustrates an embodiment of a protocol stack for a fixed NRT service according to the present invention.

FIG. 3 illustrates a diagram for a protocol stack of an NRT service configured according to an embodiment of the present invention.

In an embodiment of the present invention, for fixed NRT service, the file-type NRT service is packetized according to an IP scheme in the IP layer and then transmitted through a specific virtual channel in an MPEG-2 TS format.

In an embodiment of the present invention, as an example of the MPEG-2 based Program Specific Information/Program and System Information Protocol (PSI/PSIP) table, the presence of the NRT service or the identification information of the NRT service may be signaled through the virtual channel in the Virtual Channel Table (VCT).

In an embodiment of the present invention, the NRT service signaling channel that transmits NRT service signaling data which signals the access information of the IP based NRT service is transmitted in an MPEG-2 TS format after being packetized according to an IP stream in the IP layer through a specific virtual channel.

More specifically, in the broadcast station, NRT content/files are packetized according to a file transfer protocol scheme and are again packetized according to an Asynchronous Layered Coding/Layered Coding Transport (ALC/LCT) scheme as shown in FIG. 3. The packetized ALC/LCT data is again packetized according to an UDP scheme and the packetized ALC/LCT/UDP data is again packetized into ALC/LCT/UDP/IP data according to an IP scheme. In the present invention, the packetized ALC/LCT/UDP/IP data is referred to as an "IP datagram" for ease of explanation.

In addition, NRT service signaling data required to receive the NRT content/files is transmitted through an NRT service signaling channel. Here, the NRT service signaling channel is packetized according to a User Datagram Protocol (UDP) scheme and the packetized UDP data is again packetized into UDP/IP data according to an IP scheme. In the present invention, the UDP/IP data is also referred to as an "IP datagram" for ease of explanation. In an embodiment, multicast of the NRT service signaling channel is achieved after being encapsulated in an IP datagram having a well-known IP destination address and a well-known destination UDP port number.

In an embodiment of the present invention, IP datagrams of the NRT service signaling channel and the NRT service are encapsulated in an addressable section structure and again packetized in an MPEG-2 TS format. So, one addressable section structure has a format in which a section header and a CRC checksum are added to one IP datagram. This addressable section structure format complies with a Digital Storage Media Command and Control (DSM-CC) section format for private data transmission. Thus, the addressable section is also referred to as a "DSM-CC addressable section." A 188-byte MPEG-2 TS packet can be created by dividing the addressable section data into 184-byte units and adding a 4-byte MPEG header to each 184-byte unit. At this time, a value allocated to a PID of the MPEG header is a unique value that can identify TS packets that carry the NRT service signaling channel and the NRT service.

Program Specific Information (PSI) and Program and System Information Protocol (PSIP) table section data is also packetized into MPEG-2 TS packets.

An embodiment of the PSI table may include a Program Map Table (PMT), a Program Association Table (PAT), or the like and an embodiment of the PSIP table may include a Virtual Channel Table (VCT), a System Time Table (STT), a Rating Region Table (RRT), an Extended Text Table (ETT), a Direct Channel Change Table (DCCT), a Direct Channel Change Selection Code Table (DCCSCT), an Event Information Table (EIT), and a Master Guide Table (MGT).

The MPEG-2 TS packets are modulated according to a predetermined transmission scheme, for example, a VSB transmission scheme, in a physical layer and are then transmitted to the reception system.

In an embodiment of the present invention, the transmission of an NRT service is determined by signaling through a PSI/PSIP table. For example, whether or not an NRT service is transmitted is signaled in a Virtual Channel Table (VCT).

FIG. 4 illustrates a syntax structure of the Virtual Channel Table (VCT) section according to an embodiment.

The VCT section, taking information about the virtual channel for example, transmits information of channel information for channel selection and PID information for receiving audio and/or video. Thus, when the VCT section is parsed, the PID of the audio and video of the broadcast program transmitted within the channel along with the channel number and channel name is known.

The VCT section syntax includes at least one of table_id field, section_syntax_indicator field, private_indicator field, section_length field, transport_stream_id field, version_number field, current_next_indicator field, section_number field, last_section_number field, protocol_version field, num_channels_in_section field.

The VCT section syntax further includes first 'for' loop (virtual channel loop) which repeats for the number indicated in the num_channels_in_section field value, the first loop includes at least one of short_name field, major_channel_number field, minor_channel_number field, modulation_mode field, carrier_frequency field, channel_TSID field, program_number field, ETM_location field, access_controlled field, hidden field, service_type field, source_id field, descriptor_length field, or second 'for' loop which repeats for the number of the descriptors included in the first loop. For the convenience of explanation in the present invention, the second loop is referred to as the first descriptor loop. The descriptor( ) included in the first descriptor loop is a descriptor applied in each virtual channel.

The VCT section syntax may further include a third 'for' loop which repeats for the number of value indicated by additional_descriptor_length field and the number of descriptor added in the VCT section. For the convenience of explanation in the present invention, the third loop is referred to as the second descriptor loop. The additional_descriptors( ) included in the second descriptor loop is applied to all the descriptors described in the virtual channel of the VCT section.

A table_id field illustrated in FIG. 4 indicates a unique identifier or identification (ID) which identifies that the information transmitted through the table is VCT. More specifically, the table_id field indicates a value informing that the table corresponding to this section is a VCT. For example, a 0xC8 value may be given to the table_id field.

A version_number field indicates the version number of the VCT, the section_number field indicates the number of this section, and the last_section_number field indicates the number of the last section of a complete VCT. The num_channels_in_section field designates the number of the overall virtual channel existing within the VCT section.

A short_name field in the first 'for' loop indicates the name of a virtual channel. The major_channel_number field indicates a 'major' channel number associated with the virtual channel defined within the first loop and the minor_channel_number field indicates 'minor' channel number. Thus, each channel number should be connected to the major and minor channel numbers, and the major and minor channel numbers are used as user reference numbers for the corresponding virtual channel.

A program_number field is shown for connecting the virtual channel having an MPEG-2 program association table (PAT) and program map table (PMT), and matches the program number within the PAT/PMT. Here, the PAT describes the elements of a program corresponding to each program number, and the PAT indicates the PID of a transport packet transmitting the PMT. The PMT describes the affiliated information and the PID list of the transport packet in which the identification number and the audio/video information of a program is transmitted in bit sequence.

A service_type field indicates the service type within the corresponding virtual channel.

In an embodiment, the virtual channel may include at least one RT service and at least one NRT service including audio and/or video.

In this case, service type values may be allocated as shown in FIG. 5 and a value of 0x04 representing an ATSC-data-only service may be used to indicate that an NRT service is provided through the virtual channel.

In another embodiment, the virtual channel may only include one or more NRT service. In such a case, as shown in FIG. 6, a new service_type field value of 0x08 may be defined to indicate that an NRT service is provided through the virtual channel.

A source_id field indicates a program source connected to the corresponding virtual channel.

The term "source" refers to a specific source such as a video, text, data or audio source. The source_id field has a unique value in a transport stream in which a VCT is transmitted.

On the other hand, data service table (DST) may be received through PID included in the service_location_descriptor of the VCT, and through the DST, the types of the application and the detailed information of the data broadcast stream transmitted through the channel is known.

In the present invention, NRT application (NRT service) is identified through the DST.

FIG. 7 illustrates the DST section syntax structure according to an embodiment.

A sdf_protocol_version field (8-bit) indicates the version of the Service Description Framework protocol.

An application_count_in_section field (8-bit) indicates the number of applications listed within the DST section.

A compatibility_descriptor( ) field indicates that the corresponding structure includes DSM-CC compatible descriptor. The object is to signal the compatibility requests of the application of the platform received to determine the ability to use the corresponding data service.

An app_id_byte_length field (16-bit) indicates the number of bytes used to identify the application.

An app_id_description field (16-bit) indicates the format and the semantics of the next application identification bytes. As described in the table 1 below, '0x0003' is newly assigned to identify that the corresponding application is an NRT application. The assigned value of '0x0003' is just an exemplary value and the scope of this application is not limited to the value.

TABLE 1

| Value | Application Identifier Format |
|---|---|
| 0x0000 | DASE application |
| 0x0001 | ATSC reserved |
| 0x0002 | ATSC A/92 Application |
| 0x0003 | NRT Application |
| 0x0004-0x7FFF | ATSC reserved |
| 0x8000-0xFFFF | User private |

An app_id_byte field (8-bit) describes the byte of the application identifier.

A tap_count field (8-bit) indicates the number of Tap( ) structure used by the corresponding application.

A protocol_encapsulation field (8-bit) indicates the type of the protocol encapsulation used to transmit the specific data element in reference with the Tap( ) field.

An action_type field (7-bit) instructs the character of the data in reference with the Tap( ) field.

A resource_location field (1-bit) indicates the location of the association_tag field that matches the association_tag value listed within the next Tap structure. If the value of the corresponding field is '0,' then the matching association_tag exist in the PMT of the current MPEG-2 program. Oppositely, if the value is '1,' then the matching association_tag exists in the DSM-CC Resource Descriptor in the Network Resources Table of the corresponding data service.

A Tap( ) field, for example, is defined in a unique structure including the following. The tap_id field (16-bit) is used by the application to identify the data elements. The range of the value of tap_id is determined by the app_id_byte fields related to Tap( ) within the DST. The value of tap_id is selected by the data service provider. Further, it is used in application to handle the data elements.

A Use field (16-bit) is used to specify the communication channel referenced by the association_tag.

An association_tag field (16-bit) uniquely identifies one from the listed DSM-CC resource descriptor within the Network Resource Table or listed data elementary stream within the PMT.

A Selector( ) field indicates a unique data element that can be used in the communication channel referenced by association_tag field or in the data elementary stream.

A tap_info_length field (16-bit) indicates the number of bytes of the descriptors of the next field of the corresponding field.

A tap_info_length field (16-bit) indicates the number of bytes of the descriptors of the next field of the corresponding field.

An app_info_length field (8-bit) indicates number of bytes of the descriptor of the next corresponding field.

A descriptor( ) field follows the descriptor format.

An app_data_length field (16-bit) indicates length of the app_data_byte fields in bytes.

An app_data_byte (8-bit) describes the private data fields different from input parameters associated with the application as 1 byte.

A service_info_length field (8-bit) indicates number of byte unit of the next descriptors.

A descriptor( ) field follows the descriptor format.

A service_private_data_length field (16-bit) indicates length of byte unit of the private fields.

A service_private_data_byte field (8-bit) describes the private fields as 1 byte.

Figure 8:
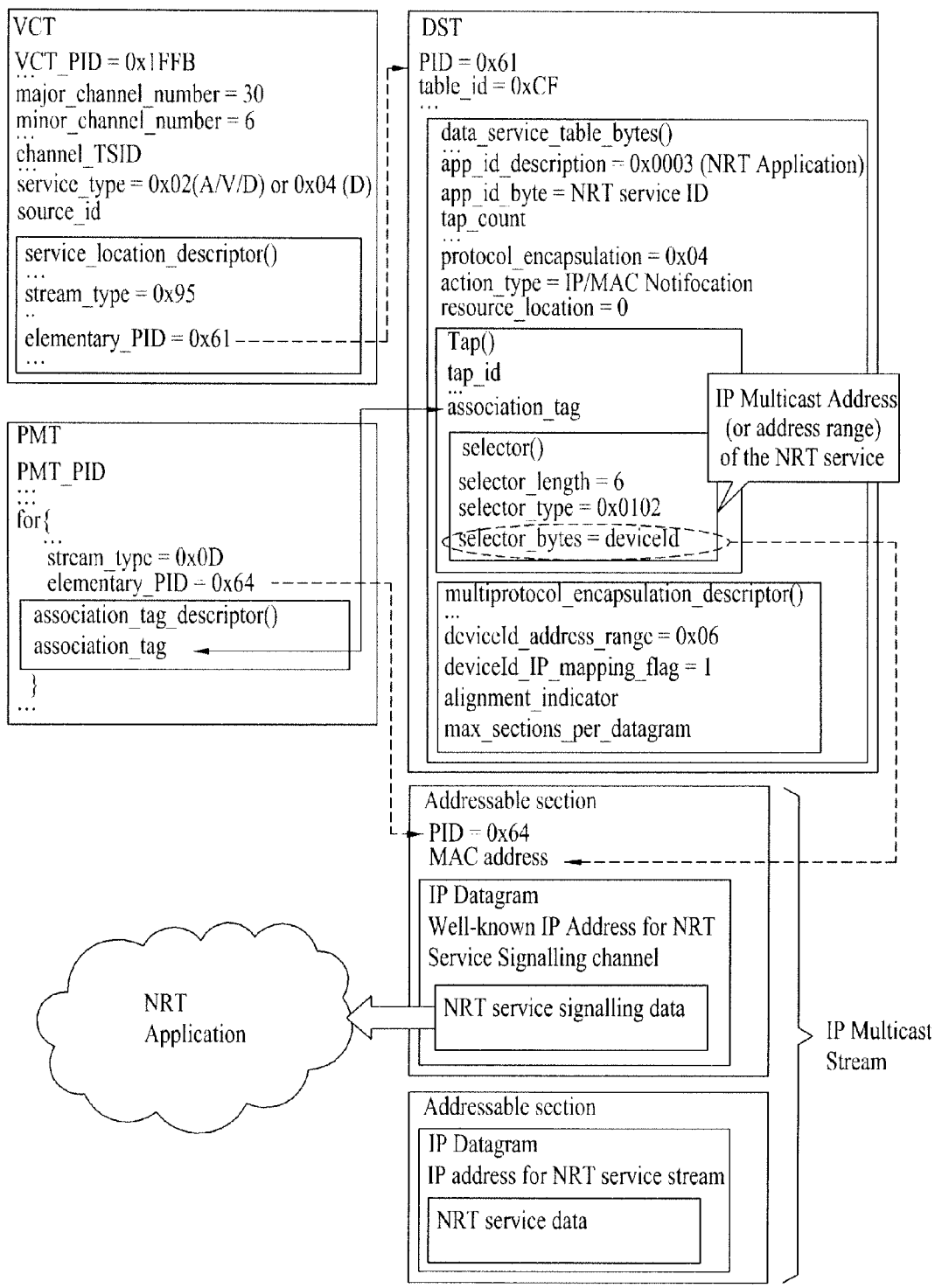
FIG. 8 illustrates an embodiment of a procedure for obtaining access information of an IP stream that carries an NRT service signaling channel using a PSI/PSIP table according to the present invention.

FIG. 8 illustrates a method in which an NRT service is received and provided using an ATSC A/90 standard for carrying (or transmitting) a data broadcast stream and an ATSC A/92 standard for transmitting an IP multicast stream in a broadcast receiver according to the present invention.

Namely, information of a stream that constitutes each virtual channel is signaled in an ES_loop of a PMT or a service location descriptor of a VCT. For example, an NRT service stream can be transmitted through the virtual channel in the case where the service type of the VCT is 0x02 (i.e., digital A/V Data), 0x04 (i.e., data only), or 0x08 (i.e., NRT only service), as shown in FIG. 5 or FIG. 6. At this time, when the stream_type field included in the service location descriptor (or the ES loop of the PMT) has a value allocated 0x95 (i.e., DST transmission), this indicates that a data broadcast is transmitted. A normal A/V is transmitted if the service location descriptor has no value for stream_type field or does not have a value of 0x95 allocated. Therefore, if the stream_type field included in the service location descriptor has a value of 0x95, the Elementary_PID field value is a PID of a Data Service Table (DST). Thus, the DST can be received through the Elementary_PID field.

The type of the application and details of a data broadcast stream transmitted through this channel can be determined through the DST. In the present invention, an NRT application (i.e., an NRT service) is identified using the DST.

That is, an App_id_description field of the DST specifies the format and analysis of application identification bytes subsequent to this field. In an embodiment of the present invention, '0x0003' is allocated to the App_id_description field in order to identify the NRT application. The illustrated value (number) is only an example and does not limit the scope of the present invention.

If the App_id_description field value is '0x0003', an Application_id_byte value subsequent to this field is a service ID of the NRT application. A service ID of the NRT application may have a URI value that globally and uniquely identifies the corresponding service.

After the NRT application is identified as described above, a PID of an MPEG-2 TS packet separated from the IP datagram of the NRT service signaling channel is located through the Tap information. Then, an IP datagram that carries the NRT service signaling channel can be obtained from MPEG-2 TS packets having the PID found through the tap information and NRT service signaling data can be obtained from the obtained IP datagram. Here, well-known IP access information, i.e., a well-known IP address and a well-known UDP port number can be used as the IP access information of the NRT service signaling channel.

That is, an asynchronous IP stream is transmitted if a Protocol_encapsulation field value in the DST is 0x04 and a device_id value indicating the destination address is transmitted through a selector_bytes value if a Selector_type field value is 0x0102. A multiprotocol_encapsulation_descriptor is used in order to accurately analyze the selector_bytes value and signals the number of valid bytes included in the device_id value. As a result, IP multicasts address (or address range) of the NRT service signaling channel transmitted through the PID can be determined through the Tap information.

Accordingly, the IP multicast address (or address range) is accessed and an IP stream, i.e., an IP packet, is received and NRT service signaling data is extracted from the received IP packet.

NRT service data, i.e., NRT content/files, is received based on the extracted NRT service signaling data and the received data can be stored in a storage medium or can be displayed on a display.

In another embodiment of the present invention, the NRT service can be signaled using a new value, for example, 0x96 instead of 0x95 as the stream type field value of the DST. This embodiment aims to eliminate the risk that the conventional receiver may malfunction with the NRT service which is a new application, in the case where the conventional receiver operates by determining whether or not a data broadcast stream is present based only on whether or not a stream having a stream type value of 0x95 is present. In this case, if a new stream type is defined, it will be possible to allow the conventional receiver to ignore this stream type, thereby guaranteeing backward compatibility.

FIG. 9 is a flowchart illustrating the process of NRT service signaling data and the process of extracting the NRT service data.

In an embodiment, as shown in FIG. 9, the service_type field in the VCT has a value of 0x08 as in FIG. 6, indicating that at least one NRT service is transmitted through the relevant virtual channel.

After a power of a receiver has been turned on, if a default channel or a channel by a user is selected (S1001), the receiver receives a VCT or a PMT (S1002). And then the receiver determines whether NRT service exists or not by parsing the VCT (S1003). This can be done through looking at the service_type in the received virtual channel loop within the VCT. The (S1001) step is processed in the tuner and the (S1002)/(S1003) step is processed in the PSI/PSIP section handler.

For instance, if a value of the service_type is not set to '0x08', the relevant virtual channel will not transmit NRT service. The virtual channel will then transmit conventional service (i.e., legacy ATSC service), the receiver processes according to the information included in the virtual channel.

If the service_type field has a value of 0x08, the virtual channel will transmit NRT service. In such a case, service location descriptor in the virtual channel of the VCT is parsed to extract the PID of DST (S1004). Then, using the extracted PID, DST is received (S1005). The (S1004) and (S1005) step is processed through the demultiplexer controlled by the service manager.

It is then determined whether the corresponding service provided on the selected channel is an NRT service from the received DST (S1006).

The determination of a presence of the NRT service can be performed by checking the value of the App_id_description field.

For instance, the value of the App_id_description is set to '0x0003,' in this present invention to identify that the service is an NRT application (i.e., NRT service). The value (number) is only an example and will not limit the scope of the present invention.

If the value of the App_id_description field is '0x0003,' the value of the subsequent Application_id_byte becomes the value of service ID of the NRT application (i.e., NRT service). As a result of identifying the NRT application, a Tap is extracted to locate the PID of the MPEG-2 TS packet separated from the IP datagram of the NRT service signaling channel (S1007). And, stream PID including association_tag of the Tap is extracted from the PMT (S1008). The steps of (S1006) to (S1008) are processed by the service manager or the PSI/PSIP section handler.

After receiving and decapsulating the MPEG-2 TS packets corresponding to the stream PID, i.e, removing the MPEG-2 header, a DSM-CC addressable section is recovered (S1009). This process is handled by the addressable section handler.

Subsequently, after removing section header and CRC checksum from the DSM-CC addressable section, IP datagram transmitting the NRT service signaling channel is recovered (S1010), and the NRT service signaling data is obtained from the recovered IP datagram (S1011). At this time, the access information of the IP datagram transmitting the NRT service signaling channel is received from a well-known destination IP address and well-known destination UDP port number.

If a value of Protocol_encapsulation in the DST is set to '0x04', an asynchronous IP datagram is transferred. If Selector_type is set to '0x0102', a value of device_id indicating a destination address is delivered via selector_bytes. In order to accurately analyze the value of the selector_bytes, multiprotocol_encapsulation_descriptor is used and the number of the valid byte within the device_id is signaled. As a result, the IP Multicast address (or address range) of the NRT service signaling channel transmitted through PID of the Tap information is known.

Thus, by accessing the IP Multicast address (or address range), IP stream, i.e., IP packet is received, and the NRT service signaling data is extracted from the IP packet.

Based on the extracted NRT service signaling data, NRT service data, i.e., NRT content item/files can be received and stored in a storage unit or can be displayed through a display.

In an embodiment, the NRT service signaling data transmitted through the NRT service signaling channel may include NRT Service Map Table (or Service Table: NST) and NRT Information Table (NRT-IT).

In an embodiment, IP datagrams of the NST and NRT-IT has the same well-known IP address and well-known UDP port number. Therefore, the determination of NST and NRT-IT included in the NRT service signaling data is done through table identifier. Thus, the table identifier can be the table_id of the corresponding table or the header of the table section, and when necessary, table_id_extension can be referred to in order to identify the table.

NRT Service Map Table (NST)

The NST provides access information of the NRT service. In an embodiment, the NST has a similar table to the MPEG-2 Private section format.

The NST provides access information of IP based NRT services included in the virtual channel. For example, the NST provides access information of each FLUTE sessions that configures one NRT service.

Here, whether one NST is configured with one session or plurality of sessions is determined through the table_id field, section_number field, last_section_number field, and the like. And the table may be completed by removing the IP header and the UDP header of the IP datagrams of the NRT service signaling channel and gathering sections having the same table identifier. For example, by gathering the sections having table identifier allocated for NST, the NST is completed.

FIG. 10 and FIG. 11 illustrate a bitstream syntax structure of an NST section according to an embodiment of the present invention. The detail of each field of the NST section is explained in the following.

Although the syntax is written in an MPEG-2 private section format for better understanding, the data may be in any format. For example, it is possible to use another method in which the syntax is expressed in a Session Description Protocol (SDP) format and is then signaled through a Session Announcement Protocol (SAP).

In FIG. 10 and FIG. 11, a table_id field includes an 8-bit unsigned integer number that indicates the type of table section being defined in NRT Service Table (NST).

A section_syntax_indicator is a 1-bit field that shall be set to '0' to always indicate that this table is derived from the "short" form of the MPEG-2 private section table.

A private_indicator (1-bit) indicates whether the type of the corresponding section follows the private section type or not. (This field that shall be set to '1')

A section_length is a 12-bit field. It specifies the number of remaining bytes this table section immediately following this field. The value in this field shall not exceed 4093 (0xFFD)).

A table_id_extension field is a 16-bit field and is table-dependent. It shall be considered to be logically part of the table_id field providing the scope for the remaining fields. The table_id_extension field includes NST_protocol_version fields.

The NST_protocol_version field is an 8-bit unsigned integer field whose function is to allow, in the future, this NST to carry parameters that may be structured differently than those defined in the current protocol. At present, the value for the NST_protocol_version field shall be zero. Non-zero values of NST_protocol_version may be used by a future version of this standard to indicate structurally different tables.

A version_number field (5-bit) indicates the version number of the NST.

A current_next_indicator field is a one-bit indicator, which when se to '1' shall indicate that the NST sent is currently applicable. When the bit is set to '0', it shall indicate that the table sent is not yet applicable and will be the next table to become valid. This standard imposes no requirement that "next" tables (those with current_next_indicator set to '0') must be sent. An update to the currently applicable table shall be signaled by incrementing the version_number field).

A section_number field is an 8-bit field that shall give the section number of this NST section. The section_number field of the first section in an NST shall be '0x00'. The section_number field shall be incremented by 1 with each additional section in the NST.

A last_section_number field is an 8-bit field that shall give the number of the last section (i.e., the section with the highest section_number) of the NST of which this section is a part).

A num_NRT_services field is an 8-bit field that specifies the number of services in this NST section.

A 'for' loop, which is also referred to as an "NRT service loop", is executed for the number of times as the number of NRT services corresponding to the num_NRT_services field value in providing signaling information of a plurality of NRT services. Thus, signaling information of the corresponding NRT service is indicated for each of the NRT services included in the NST section. Here, the following field information may be provided for each NRT service.

An NRT_service_id field is a 16-bit unsigned integer number that shall uniquely identify this NRT service within the scope of this NRT section. The NRT_service_id field of a service shall not change throughout the life of the service. To avoid confusion, it is recommended that if a service is terminated, then the NRT_service_id field for the service should not be used for another service until after a suitable interval of time has elapsed.

An NRT_service_status field is a 2-bit enumerated field that shall identify the status of this NRT Service. The most significant bit shall indicate whether this NRT Service is active (when set to '1') or inactive (when set to '0') and the least significant bit shall indicate whether this NRT Service is hidden (when set to '1') or not (when set to '0'). Hidden services are normally used for proprietary applications, and ordinary receiving devices should ignore them.

A SP_indicator field is a 1-bit field that indicates when set to 1, service protection is applied to at least one of the components needed to provide a meaningful presentation of this NRT Service.

A Short_NRT_service_name_length field (3-bit) instructs the number of byte pairs within the Short_NRT_service-_name field.

A Short_NRT_service_name filed (16*m bit) indicates a short name of the NRT service. This field may be filled with null data (for example, 0x00) when the NRT service has no short name.

An NRT_service_category field is a 6-bit enumerated type field that shall identify the type of service carried in the NRT.

A num_components field is a 5-bit field that specifies that number of IP stream components in this NRT Service.

An IP_version_flag is a 1-bit indicator, which when set to '0' shall indicate that source_IP_address, NRT_service_destination_IP_address, and component_destination_IP_address fields are IPv4 addresses. The value of '1' for this field is reserved for possible future indication that source_IP_address, NRT_service_destination_IP_address, and component_destination_IP_address fields are for IPv6.

A source_IP_address_flag field is a 1-bit Boolean flag that shall indicate, when set, that a source IP address value for this NRT Service is present to indicate a source specific multicast.

An NRT_service_destination_IP_address_flag field is a 1-bit Boolean flag that indicates, when set to '1', that an NRT_service_destination_IP_address field value is present, to serve as the default IP address for the components of this NRT Service.

A source_IP_address field is a 32 or a 128 bit field that shall be present if the source_IP_address_flag field is set to '1' and shall not be present if the source_IP_address_flag field is set to '0'. If present, this field shall contain the source IP address of all the IP datagrams carrying the components of this NRT Service. The conditional use of the 128 bit-long address version of this field is to facilitate possible use of IPv6 in the future, although use of IPv6 is not currently defined.

An NRT_service_destination_IP_address field is a 32 or a 128 bit field that shall be present if the NRT_service_destination_IP_address_flag field is set to '1' and shall not be present if the NRT_service_destination_IP_address field is not present, then the component_destination_IP_address field shall be present for each component in the num_components loop. The conditional use of the 128 bit-long address version of this field is to facilitate possible use of IPv6 in the future, although use of IPv6 is not currently defined.

A 'for' loop, which will also be referred to as a "component loop," is executed as much as the number of times as the number of components corresponding to the num_components field value to provide access information of a plurality of components. This provides access information of each component included in the NRT service. Here, the following field information may be provided for each component. In an embodiment, one component corresponds to one FLUTE session.

An essential_component_indicator field is a 1-bit indicator which, when set to '1', shall indicate that this component is an essential component for the NRT Service. Otherwise, this field indicates that this component is an optional component.

A port_num_count is a 6-bit field that shall indicate the number of destination UDP ports associated with this UDP/IP stream component. The values of the destination UDP port numbers shall start from the component_destination_UDP-_port_num field and shall be incremented by one.

A component_destination_IP_address_flag field is a 1-bit Boolean flag that shall indicate, when set to '1', that the component_destination_IP_address field is present for this component.

A component_destination_IP_address field (32 or 128 bit) shall be present if the component_destination_IP_address_flag field is set to '1' and shall not be present if the component_destination_IP_address_flag field is set to '0'. When this field is present, the destination address of the IP datagrams carrying this component of the NRT Service shall match the address in this field. When this field is not present, the destination address of the IP datagrams carrying this component shall match the address in the NRT_service_destination_IP_address field. The conditional use of the 128 bit-long address version of this field is to facilitate possible use of IPv6 in the future, although use of IPv6 is not currently defined.

A component_destination_UDP_port_num field is a 16-bit unsigned integer field that represents the destination UDP port number for this UDP/IP stream component.

A num_component_level_descriptors field (4-bit) indicates the number of descriptors providing the additional information of the component level.

The same number of the component_level_descriptor( ) is included in the component loop providing additional information as the number of the field value of the num_component_level_descriptors.

A num_NRT_service_level_descriptors field (4-bit) indicates the number of descriptors that provide additional information about the NRT service level.

The same number of the NRT_service_level_descriptor( ) are included in NRT service loop as the number of the field value of num_NRT_service_level_descriptors to provide additional information about the NRT service.

A num_virtual_channel_level_descriptors field (4-bit) indicates the number of descriptors which provides additional information about the virtual channel level.

The same number of virtual_channel_level_descriptor( ) included in the virtual channel loop as the number of the field value of the num_virtual_channel_level_descriptors to provide additional information of the virtual channel.

FIG. 12 illustrates an embodiment of a bitstream syntax structure of a component_level_descriptors( ). The component_descriptor( ) is used as one of the component level descriptor component_level_descriptors( ) of the NST and describes additional signaling information of the corresponding component.

The following is a description of each field of the component_descriptor( ).

In FIG. 12, a descriptor_tag field (8-bit) is a descriptor identifier and it can be set as an identifier that identifies the component_descriptor( ).

A descriptor_length field (8-bit) describes the remaining length of the descriptor starting after the descriptor_length field and to the end of this descriptor, in bytes.

A component_type field (7-bit) shall identify the encoding format of the component. The value may be any of the values assigned by IANA for the payload_type of an RTP/AVP stream, or it may be any of the values assigned by ATSC, or it may be a "dynamic value" in the range 96-127. For components consisting of media carried via RTP, the value of this field shall match the value in the payload_type field in the RTP header of the IP stream carrying this component. Note that additional values of the component_type field in the range of 43-71 can be defined in future versions of this standard.

A component_encryption_flag (1-bit) informs whether the corresponding component is encrypted or not.

A Num_STKM_streams field (8-bit) indicates the number STKM streams if component_encryption_flag has been encrypted. (The num_STKM_streams field (8-bit) is an 8-bit unsigned integer field that shall identify the number of STKM streams associated with this component.

A STKM_stream_id field (8-bit) is repeated as much as the field value of Num_STKM_streams and indicates a value that identifies a STKM stream that can acquire a key required for decryption.

An NRT_component_data (component_type) element provides the encoding parameters and/or other parameters necessary for rendering this component. The structure of the component_data is determined by the value of component_type field.

For example, if the component_type field value is 35 then NRT_component_data (component_type) field provides component data for H.264/AVC video stream.

In another example, if the component_type field value is 38 then NRT_component_data (component_type) field provides data for FLUTE file delivery as shown in FIG. 13.

One NRT service can be included in multiple FLUTE sessions. Thus, one NRT service may be configured with plurality of FLUTE sessions. Each FLUTE session may be signaled using NRT_component_data( ) as shown in FIG. 13.

FIG. 13 illustrates an example of the bitstream syntax structure of NRT_component_data( ) that provides data for FLUTE file delivery according to the present invention. The following explains each field in the NRT_component_data( ).

A TSI field (16-bit unsigned integer) shall be the Transport Session Identifier (TSI) of FLUTE session.

A session_start_time field (16-bit) indicates the start time of the FLUTE session. If the field values are all '0', then it can be interpreted that the FLUTE session has already begun.

A session_end_time field (16-bit) indicates the end time of the FLUTE session. If the field values are all '0,' then it can be interpreted that the FLUTE session continues for unlimited amount of time.

A tias_bandwidth_indicator field (1-bit) flags the inclusion of TIAS bandwidth information. This bit shall be set to '1' to indicate the TIAS bandwidth field is present, and it shall be set to '0' to indicate the TIAS bandwidth field is absent.

An as_bandwidth_indicator field (1-bit) flags the inclusion of AS bandwidth information. This bit shall be set to '1' to indicate the AS bandwidth field is present, and it shall be set to '0' to indicate the AS bandwidth field is absent.

A FEC_OTI_indicator field (1-bit) indicates whether FEC Object Transmission Information is provided.

A tias_bandwidth field (16-bit) exists when the as_bandwidth_indicator field value is set to '1' and it indicates the maximum bandwidth. Also, it shall be one one-thousandth of the Transport Independent Application Specific maximum bandwidth as defined in RFC 3890, rounded up to the next highest integer if necessary. This gives the TIAS bandwidth in kilobits per second.

An as_bandwidth field (16-bit) exists when the as_bandwidth_indicator field value is set to '1' and it indicates the maximum AS bandwidth. Also, this value shall be the Application Specific maximum bandwidth as defined in RFC 4566. This gives the AS bandwidth in kilobits per second.

A FEC_encoding_id field exits when the FEC_OTI_indicator field value is set to '1' and indicates FEC ID used in corresponding FLUTE session. (FEC encoding ID used in this FLUTE session, as defined in RFC 3926).

A FEC_instance_id field exists when the FEC_OTI_indicator field value is set to '1' and indicates FEC instance ID used in the corresponding FLUTE session. (FEC instance ID used in this FLUTE session, as defined in RFC 3926).

The information necessary to receive FLUTE session is provided by signaling the parameters through the NRT_component_data( ) of the component_descriptor( ) within the component loop.

In other words, according to the time information set by the session_start_time field and the session_end_time field, the corresponding FLUTE session is opened and files and the FDT (File Description Table) that describes the signaling information of the files that configures NRT service (or content) is received. The FDT is used to transmit the list of all the content items, and also provides information necessary in acquiring content item and the files included in the content item.

For example, each file configuring a content item may be identified by using a Content-Location indicated in an FDT of a FLUTE session. The Content-Location indicates an identifier that can identify the corresponding file. Herein, the Content-Location is configured in an any URI (Uniform Resource Identifier) format. More specifically, the Content-Location value is a locator including the file name.

At this point, a content linkage identifying the corresponding content item may be allocated (or assigned) for each file level or instance level of the FDT. In this case, each file may be identified by using content linkage, transfer object identifier (TOI), and Content-Location values indicated in the FDT of the FLUTE session. Herein, the content linkage corresponds to an identifier that can identify the content item, and the TOI corresponds to an identifier that can identify a transport object, i.e., file being transmitted through the FLUTE session. For example, when the TOI value is equal to '0', the file corresponds to the FDT. More specifically, the TOI value of each file configuring the content item is greater than '0'.

NRT Information Table (NRT-IT)

FIGS. 14 and 15 are bitstream syntax of an NRT-IT section according to an embodiment of the present invention.

The bit-stream syntax of the NRT-IT section is described in MPEG-2 Private section format for ease of understanding the bit-stream syntax of the NRT-IT section, but the format of the data can be in other formats as well. For example, signaling through Session Announcement Protocol (SAP) described by Session Description Protocol (SDP) type is also possible.

An NRT-IT of NRT service signaling data according to an embodiment of the present invention includes information describing a downloadable content item to store a content item in a broadcast receiver.

Here, the determination whether one NRT-IT is configured through one section or plurality of sections can be known through the table_id field, section_number field, last_section_number field, and the like, within the NRT-IT section. And the table may be completed by removing the IP header and the UDP header of the IP datagrams of the NRT service signaling channel and gathering sections having the same table identifier. For example, by gathering the sections having table identifier allocated for NRT-IT, the NRT-IT is completed.

The detailed description of the NRT-IT section fields illustrated in FIGS. 14 and 15 are described below.

A table_id field (8-bit) is set to 0xTBD to identify this table section as belonging to the Non-Real-Time Information Table.

A service_id field (16-bit) specifies the service_id field associated with the NRT service offering content items described in this section.

An NRT_IT_version_number field (5-bit) indicates the version number of this NRT-IT instance, where NRT-IT instance is defined as the set of one or more NRT_information_table_section( ) having common values for service_id field, current_next_indicator field, protocol_version field, and time_span_start field. The version number is incremented by 1 modulo 32 when any field in the NRT-IT instance changes.

A current_next_indicator field (1-bit) is always set to '1' for NRT-IT sections; the NRT-IT sent is always currently applicable.

A protocol_version field (8-bit) is set to zero. The function of protocol_version field is to allow, in the future, this table type to carry parameters that may be structured differently than those defined in the current protocol. At present, the only valid value for protocol_version field is zero. Non-zero values of protocol_version field may be used by a future version of this standard to indicate structurally different tables.

A time_span_start field (32-bit) represents the start of the time span covered by this instance of the NRT-IT, expressed as the number of GPS seconds since 00:00:00 UTC, Jan. 6, 1980. The time of day of time_span_start field is aligned to minute 00 of the hour. The value zero for time_span_start field indicates the time period covered by his NRT-IT instance began in the indefinite past. The value of time_span_start field is the same for each section of a multi-sectioned NRT-IT instance. The values of time_span_start field and time_span_length field are set such that the specified time span does not overlap with any other NRT-IT instance in this IP subnet.

A time_span_length field (11-bit) indicates the number of minutes, starting at the time indicated by time_span_start field, covered by this instance of the NRT-IT. Once established, the value of time_span_length field for a given value of time_span_start field does not change. A value of time_span_length field of zero means this NRT-IT instance covers all time starting at time_span_start field into the indefinite future. If the value of time_span_start is zero, time_span_length field has no meaning. The value of time_span_length field is the same for each section of a multi-sectioned NRT-IT instance. The values of time_span_start field and time_span length field are set such that the specified time span does not overlap with any other NRT-IT instance in this IP subnet.

A num_items_in_section field (8-bit) indicates the number of content items described in this NRT-IT section.

The 'for' loop (also referred to as content item loop) is executed for number of content items corresponding to the value of the num_items_in_section field and provides signaling information about plurality of content items. Thus, the signaling information of the content item of each content item included in the NRT service corresponding to the service_id field value is indicated. The following describes the field in each content item that may provide the information.

The content_linkage field is a 32-bit field having a value ranging from 0x0001 to 0xFFFF. The content_linkage field indicates an identification number of the corresponding content (or content item). Herein, the value 0x0000 is not used. The content_linkage field performs two linkage functions. One linkage function is to link the metadata included in an NRT-IT with at least one or more files included in an FLUTE FDT, which is associated with the NRT service. The other linkage function is to form a TF_id field, i.e., an identifier for a Text Fragment in a Text Fragment Table. The value of the content_linkage field corresponds to one of the values of the FDT-Content-Linkage elements or to one of the values of the File-Content-Linkage elements within the FLUTE FDT for each of the files associated with the content item. The precedence rules may be applied when matching each content_linkage value with the corresponding content linkage elements in the FLUTE FDT.

An updates_available field (1-bit) indicates whether the corresponding content item is updated. For example, when the content item is included in an NRT service that is ended after once service, the field is set to '0'. When the content item is one more updated, the field is set to '1'. That is, the updates_available field specifies, when set to '1,' that the referenced content item(s) will be updated. When the updates_available field is set to '0,' updates are not expected to be provided for the associated content item(s), and broadcast receivers are not expected to look for them.

A TF_available field is Boolean flag, this field specifies, when set to '1' that a Text Fragment is present in a Text Fragment Table in the service signaling channel. When the field is set to '0,' no Text Fragment is included in the service signaling channel for this content item.

A low_latency field is Boolean flag, this field specifies, when set to '1,' that the content is available within the current digital transport with a low enough latency that its retrieval should be attempted while the user waits. When the field is set to '0', retrieval latency is longer and the user interface should suggest to the user to return later for viewing.

A playback_length_in_seconds field (20-bit) specifies the duration of playback of the content, in seconds. For content consisting only of text and/or still images, the value zero is used. For content that includes audio or audio/video content, the playback_length_in_seconds field indicates the playback length of the audio or audio/video content.

A content_length_included field is Boolean flag, this field indicates, when set to '1,' that the content_length field is present in this iteration of the "for" loop. Setting this field to '0' indicates the content_length field is not present in this iteration of the "for" loop.

A playback_delay_included field is Boolean flag, this field indicates, when set to '1,' that the playback_delay field is present in this iteration of the "for" loop. Setting this field to '0' indicates the playback_delay field is not present in this iteration of the "for" loop.

An expiration_included field is Boolean flag, this field indicates, when set to '1,' that the expiration field is present in this iteration of the "for" loop. Setting this field to '0' indicates the expiration field is not present in this iteration of the "for" loop.

A duration field (12-bit) in the range 1 to 2880 specifies the expected cycle time, in minutes, of the carousel containing the referenced content item. A broadcast receiver is expected to use the duration parameter to determine the amount of time needed to capture the referenced content.

A content_length field (40-bit), when present, represents the total size in bytes of the content item or items. This item is used by the broadcast receiver to determine if enough memory is available to store it before downloading is attempted.

A playback_delay field (20-bit) counts of the number of seconds following reception of the first byte of the associated content the broadcast receiver waits before playback may start, while buffering the incoming stream. A value of zero indicates playback may commence immediately. When playback_delay field is not provided, the broadcast receiver is expected to retrieve the complete file or file set prior to playback.

An expiration field is a 32-bit field, which indicates an expiration time of the corresponding content.

A content_name_length field is an 8-bit field, which indicates the total length of the subsequent content_name_text( ) field in byte units. The content_name_text( ) field specifies a title of a corresponding content (or content item) in a multiple string structure (MSS).

A content_descriptors_length field is a 12-bit field, which indicates the total length of the subsequent content_descriptor( ) field in byte units.

The content_descriptor( ) field corresponds to a descriptor providing additional information on a content level, the content_descriptor( ) field being individually applied to each content (or content item).

A descriptors_length field is a 10-bit field, which indicates the total length of the subsequent descriptor( ) field in byte units.

The descriptor( ) field is commonly applied to all contents (or content items) being described in the current NRT-IT section.

Also, according to an embodiment of the present invention, information (or parameter) essentially required for rendering content/files, which configure the NRT service, e.g., encoding information and decoding parameters applied to the video, audio, and so on, included in an NRT service or content, is transmitted to the broadcast receiver. For example, the encoding information may correspond to codec information of the video and audio included in the NRT service or content.

The encoding information and decoding parameter may be signaled through an in-line field of the descriptor, thereby being transmitted, or may be signaled through an in-line field of the NST or NRT-IT, thereby being transmitted. At this point, the descriptor is included in any one of a FLUTE session level or NRT service level, or component level or content level.

Also, according to an embodiment of the present invention, the encoding information and decoding parameter are provided in text formats expressed as a multi-purpose Internet mail extensions (MIME) type. More specifically, the broadcast receiver according to the present invention indicates and transmits the encoding information and decoding parameter in a text format.

Meanwhile, an NRT service according to the present invention includes at least one or more contents (or content items or NRT contents), as shown in FIG. 2, and one content includes at least one or more files.

And, the files included in the content are provided to the NRT through the FLUTE session. However, the files included in the content may be provided not only through the FLUTE session, but also through the Internet.

At this point, according to an embodiment of the present invention, Internet access information of the content is provided through a content level descriptor of the NRT-IT. In the description of the present invention, the corresponding descriptor will be referred to as an internet location descriptor internet_location_descriptor( ). The internet location descriptor includes a URL( ) field, which indicates the internet URL of the content.

Also, according to another embodiment of the present invention, an indicator field indicating whether or not the content is also being provided through (or available on) the internet is added to the NRT-IT field. In the description of the present invention, the field is this case will be referred to as an available_on_internet field. When the value of the available_on_internet field indicates that the corresponding content is available on the internet, the Content_Location attribute within the FLUTE FDT corresponding to each file that belongs to the content indicates the internet URL of the file.

More specifically, when the value of the available_on_internet field within the content loop of the NRT-IT indicates that the corresponding content is available on the internet, the Content_Location attribute of each file within the FLUTE FDT indicates the internet address of the corresponding file.

If the internet access information is provided through the internet location descriptor, the available_on_internet field may be omitted from the NRT-IT of FIG. 14 and FIG. 15.

FIG. 16 and FIG. 17 respectively illustrate an exemplary FDT XML (eXtensible Markup Language) schema according to the present invention.

According to FIG. 16 and FIG. 17, when an attribute is required to be commonly defined in all files declared in the FDT (or FDT instance), an FDT instance level is defined, and when an attribute is required to be independently defined in each file, an FDT file level is defined.

Referring to FIG. 16 and FIG. 17, the portion marked as number 1 corresponds to a declaration of a content linkage in an FDT instance level. The content linkage declared herein is given to all files declared in the corresponding FDT instance. Evidently, this information may be overridden by newly giving a content linkage from the file level. Alternatively, when a specific file belongs not only to the content (or content item)

defined in the FDT instance level but also to another content, the content linkage may be given from the file level, which is then notified.

The portion marked as number 2 corresponds to a declaration of a content linkage in a file level. Herein, when the files included in the FDT instance belong to different contents, this method is used to signal the content to which each file belongs.

The portion marked as number 3 corresponds to a method of notifying for each file whether or not the corresponding file is an entry file. More specifically, among the plurality of files configuring the content, a file corresponding to a root file, which must be reproduced first, or which must be executed first in order to access the content, is referred to as an entry file. Herein, an entry attribute may be omitted, and when the default value is set to 'false' and is omitted, this indicates that the corresponding file is not an entry file.

As described above, by signaling each entry status in the file level depending upon the group to which the corresponding file belongs, a specific file may perform an entry function in a specific group and may not perform any entry function in other groups.

Also, in the file level marked as number 2, one file element provides additional information by using one or more attributes. Referring to FIG. 16 and FIG. 17, one file element uses Content-Location, TOI, Content-Length, Transfer-Length, Content-Type, Content-Encoding, Content-MD5, FEC-OTI-FEC-Encoding-ID, FEC-OTI-FEC-Instance-ID, FEC-OTI-Maximum-Source-Block-Length, FEC-OTI-Encoding-Symbol-Length, FEC-OTI-Max-Number-of-Encoding-Symbols attributes, so as to provide location information, TOI, length information, type information, encoding information, etc., on the corresponding file.

When the file element of FIG. 16 and FIG. 17 corresponds to a file belonging to a content available on the internet, the present invention includes the internet address in the Content-Location attribute value marked as number 4. For example, the Content-Location attribute within the FLUTE FDT corresponding to each file belonging to the content item indicates the internet URL of the corresponding file. More specifically, in this case, the Content-Location attribute limits the type of the file to 'Internet URL'.

As described above, the content may be downloaded through the FLUTE session, or may be downloaded through the internet. The content downloaded through the FLUTE session or through the internet is stored in a storage medium based upon the settings of the broadcast receiver, a download reservation request, and so on. Additionally, a real-time content (i.e., A/V packet) is also stored in storage medium based upon any one of the temporary recording, reserved recording, time-shift requests. In the description of the present invention, the content being downloaded through the FLUTE session and stored will be referred to as an NRT content, and the content being downloaded through the FLUTE session and stored will be referred to as a web content, for simplicity. Also, a real-time content being stored based upon any one of the temporary recording, reserved recording, time-shift requests will be referred to as a PVR content. At this point, the NRT content, the web content, and the PVR content may each be stored in a different storage medium, or may all be stored in the same storage medium.

The NRT content, web content, and PVR content, which are stored in the storage medium, are managed by the user. More specifically, each content may be deleted from the storage medium upon request made by the user. In the description of the present invention, the contents being managed by the user, including the NRT content, the web content, and the PVR content, will be collectively referred to as user contents, for simplicity.

Meanwhile, some contents may be managed by an operator (e.g., the service provider). In the description of the present invention, such contents will be referred to as operator contents. The operator contents correspond to targeted advertisements, announcements (or notices) provided by the service provider, and so on. The operator contents are not controlled by the user. For example, the user is unable to directly delete the operator contents from the storage medium.

As described above, each type of contents may be classified as Operator-controlled contents, which are controlled by the operator, and User-controlled contents, which are controlled by the user.

Furthermore, a space for storing the operator contents should be allocated in the storage medium.

The storage space for the operator contents may be automatically allocated based upon the total capacity of the storage medium, or a default capacity may be allocated regardless of the stored size.

According to an embodiment of the present invention, the user may manually allocate the storage space for the operator contents through a set-up screen. For this, the broadcast receiver according to the present invention includes a menu enabling a storage space of the operator contents to be set-up.

FIG. 18 illustrates an example of a storage medium management screen being displayed based upon a selection made from a storage medium management menu according to the present invention.

Referring to FIG. 18, the total space of the storage medium is 35 GB. And, herein, the storage space for the operator contents is 0.1 GB, the storage space for the NRT contents is 10 GB, the storage space for the PVR contents is 15 GB, and the storage space for the web contents is 9.9 GB.

As shown in FIG. 18, an Up button is used for expanding (or increasing) the capacity of a selected storage space item, and a Down button is used for reducing (or decreasing) the capacity of the selected storage space item. Also, a change quota is used for allocating the storage space modified by the Up/Down button as the final storage space.

At this point, according to an embodiment of the present invention, the minimum storage space for the operator contents is pre-decided, and the user is unable to allocate the storage space from the operator contents to a size smaller than the pre-decided minimum storage space (or minimum space).

Also, the user should be aware (or informed) of the minimum space for the operator contents. For example, as shown in FIG. 18, when an operator usage item is selected, the minimum space may be informed in a text format at one portion of the set-up screen. More specifically, by selecting an operator usage item, the user may set up the storage space for the operator contents. For example, according to the present invention, when the Up button is selected from the bottom side of the set-up screen, while the operator usage item is high-lighted, the operator storage space is increased, and when the Down button is selected, the operator storage space is decreased.

At this point, once the operator storage space becomes the minimum storage space due to the Down button, the storage space no longer becomes smaller no matter how many times the Down button is pressed afterwards. The remaining storage space, for example, the storage space for the NRT contents, PVR contents, and web contents, may be directly allocated by the user, or the remaining storage space may be automatically allocated by the broadcast receiver depending upon the capacity of the storage medium.

Also, in FIG. 18, the storage medium for each of the NRT contents, the PVR contents, and the web contents is independently managed. However, at least two types of contents may be combined so as to be managed in a single storage space.

In the present invention, the operator may provide a differentiated service depending upon the size of the storage space for the operator contents allocated by the user. For example, depending upon the size of the storage space for the operator contents, a subscription fee may be differently charged or the usage fee may be differently charged.

Also, when the storage space is managed from the storage medium management screen, the present invention may set-up a preference condition for each storage space. According to an embodiment of the present invention, the present invention may further display a Menu button for user preference configuration on a portion of the storage medium management screen of FIG. 18.

FIG. 19 illustrates an exemplary user preference configuration screen, while the operator usage item is high-lighted.

FIG. 19 shows an example of inputting configuration settings such as 'Male' for Gender, '20~30' for Age, 'Seoul, Korea' for Location, 'Soccer and Basketball' in 'Sports' and 'Show' for Genre, 'Camera' for Hobby, and '18 Months' for validation period ('Delete contents if older than') of the corresponding content (i.e., storage period of the content).

As described above, when the user preference conditions are set-up, the management of the operator contents is automatically executed in accordance with the inputted settings. For example, among the contents provided by the operator, only the operator contents that satisfy the user preference conditions may be automatically stored in the storage medium. Alternatively, when a two-way (or bi-directional) communication is available between the server of the operator and the broadcast receiver, the user preference condition set-up in the broadcast receiver is transmitted to the server of the operator. Thereafter, the server of the operator may transmit only the contents satisfying the user preference conditions to the corresponding broadcast receiver.

In another example, among the contents provided from the operator, the broadcast receiver may use a text or icon to notify the user of the contents satisfying the user preference conditions. Then, the user may select whether or not to download the corresponding content based upon the notified information.

Then, when it is assumed that the operator contents corresponding to the user preference condition is stored in the storage medium, when a period of 18 months is completed starting from the date at which the operator content was downloaded, the operator content is automatically deleted from the storage medium.

As described above, the present invention provides a user preference configuration screen for filtering targeted advertisements, which are to be stored in the storage space of the operator contents, and for rule setting en bloc deletion of the operator contents. Herein, the user may input adequate parameters through the user preference configuration screen.

The operations of the broadcast receiver according to the user preference configuration may also be directly applied to different contents, such as NRT contents, PVR contents, and web contents, without modification.

Meanwhile, when using a service guide, the user may easily perform selecting, storing (i.e., recording) operations on the NRT contents, web contents, and PVR contents. In the description of the present invention, a service guide for the PVR contents will be referred to as an RT-specific service guide, and a service guide for the NRT contents and web contents will be referred to as an NRT-specific service guide, for simplicity. Also, in the description of the present invention, a screen configured of the RT-specific service guide will be referred to as an RT-specific service guide screen, and a screen configured of the NRT-specific service guide will be referred to as an NRT-specific service guide screen, for simplicity.

At this point, the RT-specific service guide and the NRT-specific service guide may be simultaneously displayed on a single screen. Or, any one of the RT-specific service guide and the NRT-specific service guide may only be displayed on the screen. In addition, the RT-specific service guide screen may be shifted to the NRT-specific service guide screen, or the NRT-specific service guide screen may be shifted to the RT-specific service guide screen.

In the present invention, the RT-specific service guide screen may be implemented by using a PSI/PSIP table, and the NRT-specific service guide screen may be implemented by using an NRT service signaling channel. For example, schedule information of a PVR content may be acquired from an event information table (EIT) from the PSI/PSIP table. And, among the NRT service signaling channels, schedule information of an NRT content and a web content may be acquired from the NRT-IT.

FIG. 20 illustrates an exemplary RT-specific service guide screen according to the present invention.

In FIG. 20, the title of a program (i.e., content) that is currently served through a current RT based upon a current time, or the title of a program (i.e., content) that is to be served through an RT in a future process is displayed for each broadcast station (i.e., channel). According to an embodiment of the present invention, a button that allows the screen to shift to the NRT-specific service guide screen is displayed on a portion of the RT-specific service guide screen. In the description of the present invention, this button will be referred to as a "View previous program" button, for simplicity.

FIG. 21 illustrates an exemplary NRT service guide screen, which can be displayed when the "View previous program" button is selected from the RT-specific service guide screen of FIG. 20.

According to an embodiment of the present invention, a button that allows the screen to shift to the RT-specific service guide screen is displayed on a portion of the NRT-specific service guide screen. In the description of the present invention, this button will be referred to as a "View current program" button, for simplicity.

The NRT-specific service guide screen of FIG. 21 corresponds to an example wherein programs that were broadcasted in the past are categorized, for example, by genre and displayed. Herein, according to an embodiment of the present invention, the genre information of each program is provided through a genre descriptor included in a service level of the NST or a content level of the NRT-IT. Also, since it is assumed in the NRT-specific service guide screen that each program corresponds to a previous program, the actual broadcasting time of each program may also be displayed. At this point, the downloadable time of each program may also be displayed. According to another embodiment of the present invention, the previously broadcasted programs may also be categorized by channel, by broadcasted date, and by title, thereby being displayed on the NRT-specific service guide screen.

The RT-specific service guide screen and the NRT-specific service guide screen of FIG. 20 and FIG. 21 are merely examples provided to facilitate the understanding of the present invention. Therefore, since the configuration of the RT-specific service guide screen and the NRT-specific service guide screen may be easily modified by anyone skilled in the art, the present invention will not be limited only to the examples given in the description set forth herein.

When a program satisfying the user preference condition exists among the programs displayed on the service guide screens of FIG. 20 and FIG. 21, the present invention may notify the presence of such program to the user by using a text or an icon. More specifically, it is assumed that Junior Soccer of FIG. 20 and Professional Baseball of FIG. 21 both satisfy the user preference condition set-up in the user preference set-up screen of FIG. 19. According to an embodiment of the present invention, both the Junior Soccer and the Professional Baseball are marked with a smile icon, as shown in FIG. 20 and FIG. 21.

At this point, the programs marked with smile icons may be automatically stored in the storage medium. Alternatively, the programs marked with smile icons may be used for reference purposes to allow the user to easily recognize his (or her) preferred programs.

Herein, in the NRT-specific service guide screen, as shown in FIG. 21, when the user uses an input means, such as a remote controller, a keyboard, a mouse, a touch pad, and so on, to select a specific program, a sub-menu (or a sub pop-up window) enabling the user to select "Play Now" or "Schedule Advance Recording" in accordance with the attributes of the respective program, is displayed. FIG. 21 shows an example of a sub-menu screen enabling the user to select at least one of "Play Now" and "Schedule Advance Recording", when the user selects a program entitled "Heroes Episode 5".

Also, when additional information related to the selected program is served via NRT, an additional information button may be displayed on the sub-menu screen in the form of a text or icon, so as to allow the user to recognize the presence of the additional information and select the corresponding information. At this point, when the additional information button is selected, the corresponding additional information is provided to the user. The additional information corresponds to previews (or recaps), watch full episodes, music video, original sound track (OST) related to the program.

When several additional information related to the program exist, an additional information list may be displayed, so as to provide specific additional information selected from the additional information list to the user.

According to an embodiment of the present invention, even if the program available for "Play Now" and the program available for "Schedule Advance Recording" correspond to the same program, if the resolution of the two programs is different, the resolution information of each program is indicated next to each program by using a text format or an icon, thereby enabling the user to recognize the difference in resolution and to select the preference program.

According to another embodiment of the present invention, in case of a program that is neither available for "Play Now" nor for "Schedule Advance Recording", even if a cursor (or high-light) is placed on the corresponding program within the service guide screen, the corresponding program is inactivated, so that the user cannot select the corresponding program. More specifically, even if the corresponding program is selected, a related sub-menu is not displayed. However, if at least one of "Play Now" and "Schedule Advance Recording" is available, then the related sub-menu is displayed.

Meanwhile, when the user selects the "Play Now" item from the sub-menu screen of the NRT-specific service guide screen shown in FIG. 21, the corresponding program may be pre-stored in the storage medium (e.g., HDD, flash memory) of the respective broadcast signal or may be directly provided from the internet.

If the program available for "Play Now" is a program being provided from a web server through an internet access (i.e., web contents), the internet access information of the program may be acquired through the above-described internet location descriptor, or may be acquired through content-location attributes of the corresponding files of the FLUTE FDT, which belongs to the content corresponding to the program.

Furthermore, when the user selects the "Schedule Advance Recording" item, the files that belong to the content respective to the selected program are downloaded through the FLUTE session at a predetermined time, so as to be stored in the storage medium of the respective broadcast receiver. Thereafter, the stored files are immediately outputted or outputted upon the user's request to an output device, so as to be displayed. Then, once the downloading of the program is completed, an identification information that can identify the completion of the downloading process may be marked in a portion of the RT service screen or marked on the corresponding program within the NRT-specific service guide screen in the form of a text or icon, thereby notifying the user that the downloading process is completed.

According to an embodiment of the present invention, a program being downloaded from a web server through the internet is stored in a web contents storage space of the storage medium. And, a program being downloaded through the FLUTE session is stored in an NRT contents storage space. At this point, the web contents storage space and the NRT contents storage space may be differentiated in the same storage medium, or may be differentiated in different storage medium.

Meanwhile, in some occasions, the program downloaded via "Play Now" or the program downloaded via "Schedule Advance Recording" may not be played-back by the broadcast receiver. In this case, playback may not be performed for many reasons. One of the reasons corresponds to when a codec for decoding the program does not exist in the broadcast receiver. The presence of a codec for decoding the corresponding program in the broadcast receiver may be known by using at least one of the encoding information and the decoding parameter, which are received in a MIME type text form through the NST or NRT-IT. The encoding information may include codec information used in the video stream of the corresponding program, codec information used in the audio stream of the corresponding program, and so on. Also, the MIME type encoding information may be provided by being inserted in the NST or NRT-IT in a field format, or may be provided by being inserted in a descriptor format. For example, it is assumed that a text indicating "The video codec used in Program A is A2" is included in the encoding information as a MIME type. However, if the video codec A2 is not installed in the broadcast receiver, the broadcast receiver is incapable of playing-back the corresponding program. At this point, it is also assumed that neither the video codec A2 nor any other backward compatible codec is installed.

At this point, according to an embodiment of the present invention, since playback cannot be performed even if the program is downloaded, a message is displayed so as to allow to user to acknowledge the situation. Herein, according to an embodiment of the present invention, the message is displayed in the form of a pop-up window.

For example, it is assumed that a download schedule is reserved in the sub-menu screen and that a video codec for the program scheduled for downloading is not installed in the respective broadcast receiver. In this case, based upon the transmitted MIME-type encoding information and decoding parameter, the broadcast receiver may create codec information of the selected program, as shown in FIG. 22, which is then displayed in the form of a pop-up window. Alternatively, the broadcast receiver may also generate a message saying "The video codec required for decoding Program A does not exist in this broadcast receiver." or "The video codec required for decoding Program A does not exist in this broadcast receiver. Do you wish to download the required video codec?" or "The video codec required for decoding Program A is A2."

The message is then displayed in the form of a pop-up window. Such message may also be applied when the playback option of a downloaded program is selected.

FIG. 23 and FIG. 24 illustrates examples of a message that can be displayed in the form of a pop-up window, when playback cannot be performed due to the absence of a codec required playing-back a downloaded program in the broadcast receiver. According to an embodiment of the present invention, the message is created based upon the encoding information and decoding parameter, which are displayed as a MIME-type text.

In the example shown in FIG. 23, the broadcast receiver displays a message saying "Due to the absence of the video codec, Program A cannot be played." This message allows the user to recognize the reason why the corresponding program cannot be played (or played-back).

In the example shown in FIG. 24, the broadcast receiver displays a message saying "Due to the absence of the video codec, Program A cannot be played. Do you wish to download the required video codec?" Herein, buttons indicating "Yes" and "No" are also displayed so as to enable the user to select download.

When the user selects the button saying "Yes", then the required video codec is downloaded. The video codec may be provided through an NRT service or may be provided from a web server through the internet.

At this point, the downloaded video codec may be automatically installed in the respective broadcast receiver, or may be installed upon the user's request.

Meanwhile, when the user wishes to know what kind (or type) of content is stored in the storage medium, or when the user wishes to playback a specific content, the user may refer to the list of recording from the menu screen so as to select the corresponding content.

Based upon the request made by the user, when displaying the list of recordings, the present invention may display the list of recording in various methods.

For example, the list of recordings may be included in the entire contents stored in the storage medium. Also, when requesting the list of recordings, the user may select the storage space in which the list of recordings is to be included. For example, when it is assumed that the storage space is divided as shown in FIG. 18, and when the user has selected the NRT contents storage space and the web contents storage space, among the contents stored in the storage medium, only the NRT contents and the web contents are included in the list of recordings, thereby being displayed.

At this point, the list of recordings screen may include at least one of a content name, channel name, stored date, and content size.

FIG. 25 illustrates an example of a list of recordings being displayed on the screen, wherein the list of recordings includes only the contents stored in the NRT contents storage space according to the present invention.

The list of recordings screen of FIG. 25 includes the content name, the channel name, the stored date, and the content size. In this example, the contents stored in the NRT contents storage space are sorted and display by order of content size.

For example, the content name may be obtained from the content_name_text( ) field of the NRT-IT, and the channel name may be obtained from the short_NRT_service_name field of the NST. Also, the recorded data (validation period) may be obtained from at least one of the date when the actual recording was performed in the broadcast receiver, the duration field of the NRT-IT, the playback_delay field, and the expiration field. The content size may be obtained from the content_length field of the NRT-IT.

At this point, a simple version and a detailed version may exist for the output screen of the list of recordings. According to an embodiment of the present invention, in the simple version, at least one or more of the content name, channel name, date of recording (or stored date), and content size are displayed, as shown in FIG. 25.

The present invention may display a plurality of execution buttons (or menu buttons) on the list of recordings screen and may execute commands on view details, delete, and copy options for the corresponding content from the list of recordings.

For example, in the list of recordings of FIG. 25, the Up button is used for moving the high-lighted marked on a specific content in an upward direction, and the Down button is used for moving the high-lighted marked on a specific content in a downward direction. The View Details button is used for viewing the detailed information on the high-lighted content. The Delete button is used for deleting the high-lighted content. And, the Copy button is used for copying (or moving) the high-lighted content to another storage medium (e.g., USB memory) through an outside interface. Herein, the copying of the content may require an authentication process depending upon the copyright, encryption status of the content, and, in some cases, the copying to another storage medium may not be processed.

The present invention may be set-up so that a specific content cannot be deleted by an en bloc deletion command. For example, the user may set-up a protect option on the specific content, and the content configured with the protect option setting cannot be deleted even when an en bloc deletion command is inputted. According to an embodiment of the present invention, the protect settings and the disablement of the protect setting for a specific content can be configured (or executed) in the detailed information screen of the corresponding program.

Also, according to an embodiment of the present invention, when a high-lighted content is selected, or when a Play button (not shown) is selected, the playback of the selected content is performed.

According to another embodiment of the present invention, when a high-lighted content is selected, the detailed information of the selected content may be displayed.

According to an embodiment of the present invention, the list of recordings screen provides a sorting function. Firstly, when the list of recordings is displayed on the display screen, each content is sorted in an increasing order or decreasing order, based upon items configured in default settings or items pre-configured by the user in the broadcast receiver. And, when the list of recordings screen is displayed, a specific key of an input means, such as a remote controller, or any one of the items is selected so as to perform the sorting function in the list of recordings screen. For example, when key number 1 of an input means, such as a remote controller, is pressed, the contents displayed in the list of recordings may be sorted by content name, and when key number 2 is pressed, the contents displayed in the list of recordings may be sorted by channel name. When key number 3 is pressed, the contents displayed in the list of recordings may be sorted by date of recording, and when key number 4 is pressed, the contents displayed in the list of recordings may be sorted by content size. At this point, in order to allow the user to recognize the function of each key, the function of each key may be indicated in the form of a text or icon at a portion of the list of recordings screen.

In another example, each time the content name item is selected from the list of recordings screen, the contents of the list of recordings may be sorted by content name in an increasing order or in a decreasing order. Each time the channel name item is selected from the list of recordings screen, the contents of the list of recordings may be sorted by channel name in an increasing order or in a decreasing order. Also, each time the date of recording item is selected from the list of recordings screen, the contents of the list of recordings may be sorted by date of recording in an increasing order or in a decreasing order. And, each time the content size item is selected from the list of recordings screen, the contents of the list of recordings may be sorted by content size in an increasing order or in a decreasing order.

Furthermore, in the list of recordings screen, a check box is provided at the left-end side of each content item, and deletion and copying may be performed for at least one or more contents with a single execution command. For example, when the check box for each of content 2, content 4, and content 6 are checked, and when the Delete button is selected afterwards, content 2, content 4, and content 6 may be simultaneously deleted from the storage medium by a single deletion command. Similarly, when the check box for each of content 2, content 4, and content 6 are checked, and when the Copy button is selected afterwards, content 2, content 4, and content 6 may be simultaneously copied to another storage medium by a single copy command.

FIG. 26 illustrates another exemplary display of a list of recordings including only the contents stored in the NRT contents storage space according to the present invention. Firstly, each content stored in the NRT contents storage space is sorted by channel, and then the contents of a specific channel are sorted by the date of recording.

In the example shown in FIG. 26, the contents included in the channel named 'KBS' are sorted by the date of recording, thereby being displayed.

If the user selects the channel named 'MBC' from the list of recordings screen of FIG. 26, only the contents included in channel MBC are displayed on the list of recordings screen. Such description may be identically applied to other channels.

Referring to FIG. 26, since the undescribed details of FIG. 26 and the functions of each button are identical to those described in FIG. 25, a detailed description of the same will be omitted for simplicity.

The list of recordings screen shown in FIG. 25 and FIG. 26 are mere examples given to facilitate the understanding of the present invention. And, since the configuration of the list of recordings screen may be easily modified by anyone skilled in the art, the present invention will not be limited only to the examples given in the description of the present invention. Furthermore, the number of execution buttons displayed in the list of recordings screen, shown in FIG. 25 and FIG. 26, and their significance are also mere examples given to facilitate the understanding of the present invention. Therefore, since the addition or deletion of the execution buttons may be easily modified and altered by anyone skilled in the art, the present invention will not be limited only to the examples given in the description of the present invention.

Figure 27:
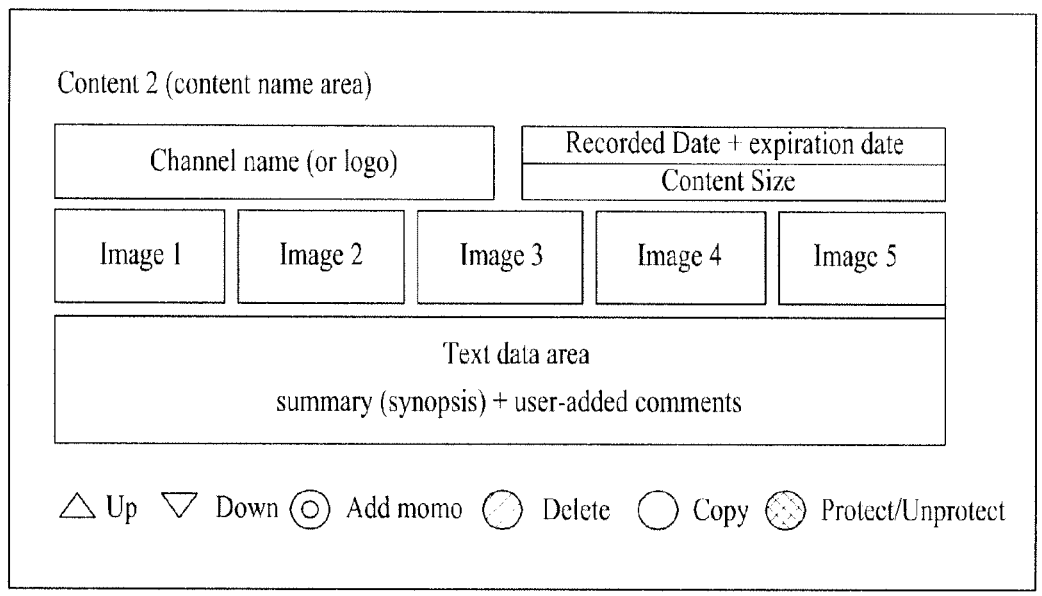
FIG. 27 illustrates an exemplary detailed information screen, which is displayed when detailed information on a specific content is requested from the list of recordings.

FIG. 27 illustrates an exemplary detailed information screen, which is displayed when detailed information on a specific content is requested from the list of recordings, as shown in FIG. 25 or FIG. 26. In the detailed information screen of FIG. 27, detailed information on the selected content and execution buttons (or menu buttons) that can execute management functions are displayed.

The detailed information screen of FIG. 27 is broadly categorized into a content name area, a channel name area, a content additional information area, an image area, and a text data area. The content name area indicates the name of the content requesting the detailed information. The channel name area may display a channel name to which the content belongs, or may display logo of the channel to which the content belongs. The content additional information area may indicate a date of recording, validation period, content size, and so on, of the content. The image area may indicate a preview, poster, thumbnail images, and so on. And, the text data area may indicate information, such as the summary (or synopsis), director's intentions, characters, on the content. Also, the text data area may also indicate text data, such as a user-added-comment and memo, on the corresponding content.

Furthermore, among the execution buttons shown in FIG. 27, an Add Memo button is used for enabling the user to directly input a comment or memo on the content. According to an embodiment of the present invention, the comment or memo inputted by the user is displayed in the text data area if the detailed information screen. The Delete button is used for deleting the content, and the Copy button is used for copying the content to another storage medium (e.g., USB memory) through an outside interface. Herein, the copying of the content may require an authentication process depending upon the copyright, encryption status of the content, and, in some cases, the copying to another storage medium may not be processed. The Protect/Unprotect button is used for setting or cancelling a protect option setting on the content. For example, when a protect option is set-up by using the Protect/Unprotect button, the content cannot be deleted by an en bloc deletion command made by the user.

The detailed information screen shown in FIG. 27 is mere an example given to facilitate the understanding of the present invention. And, since the configuration of the detailed information screen may be easily modified by anyone skilled in the art, the present invention will not be limited only to the examples given in the description of the present invention. Furthermore, the number of execution buttons displayed in the detailed information screen, shown in FIG. 27, and their significance are also mere examples given to facilitate the understanding of the present invention. Therefore, since the addition or deletion of the execution buttons may be easily modified and altered by anyone skilled in the art, the present invention will not be limited only to the examples given in the description of the present invention.

In the above description, a method of managing a storage medium storing NRT contents and a method of displaying a list of recordings on the contents stored in the storage medium have been described in detail based upon a fixed NRT service. However, it is apparent that this method can be applied to a mobile NRT service.

More specifically, a signaling information table for the mobile NRT service according to the present invention include a service map table (SMT). Also, an OMA BCAST service guide is used to provide content detailed information. The SMT is in correspondence with the NST of the fixed NRT service, and the OMA BOAST service guide is in correspondence with the NRT-IT of the fixed NRT service.

The SMT provides real-time services or non-real time services included in the mobile broadcast program and received and also provides access information of the component (or component item) included in each service.

Also, by using the SMT and the OMA BOAST service guide, the list of recordings of the NRT contents stored in the storage medium may be created and displayed on the display screen.

Since reference may be made to the fixed NRT service for the method of managing a storage medium and a method of displaying a list of recordings in the mobile NRT service, detailed description of the same will be omitted for simplicity.

Figure 28:
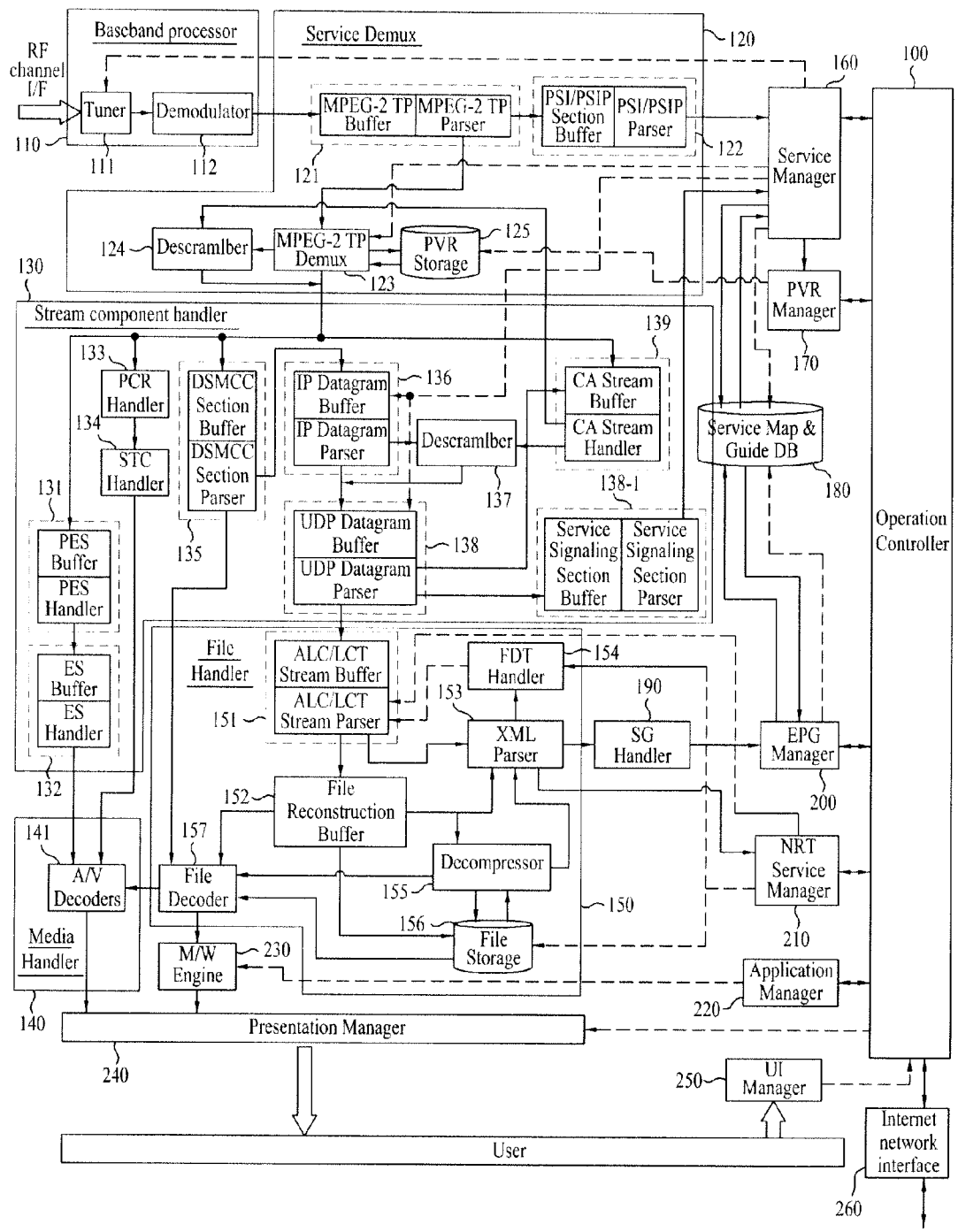
FIG. 28 illustrates a block view showing a structure of a broadcast receiver for fixed NRT services according to an embodiment of the present invention.

FIG. 28 illustrates a block view showing a structure of a broadcast receiver for fixed NRT services according to an embodiment of the present invention.

The broadcast receiver in FIG. 28 includes an Operation Controller 100, a Baseband processor 110, a Service Demultiplexer 120, a Stream component handler 130, a Media Handler 140, a File Handler 150, a Service Manager 160, a PVR Manager 170, a first storage unit 180, an SG Handler 190, an EPG Manager 200, an NRT Service Manager 210, an Application Manager 220, a Middleware Engine 230, a Presentation Manager 240, a UI Manager 250, and an internet network interface (260).

The Baseband processor 110 includes a Tuner 111 and a Demodulator 112. The Service Demultiplexer 120 includes an MPEG-2 TP Handler 121, a PSI/PSIP Handler 122, a Demultiplexer 123, a Descrambler 124 and a second storage unit 125.

The Stream component handler 130 includes a Packetized Elementary Stream (PES) decoder 131, an Elementary Stream (ES) decoder 132, a PCR Handler 133, an STC Handler 134, a DSM-CC Addressable Section Handler 135, an IP Datagram Handler 136, a Descrambler 137, a UDP Handler 138, a Service Signaling Section Handler 138-1, and a Conditional Access System (CAS) 139.

The Media Handler 140 includes an A/V Decoders 141. The File Handler 150 includes an ALC/LCT Stream Handler 151, a File Reconstruction Buffer 152, an XML Parser 153, an FDT Handler 154, a Decompressor 155, a third storage unit 156, and a File Decoder 157.

The Tuner 111 for example in FIG. 28 detects signal transmitted over the terrestrial system with the control from the Service Manager 160 and tunes only the wanted channel, down converts to Intermediate Frequency (IF), and outputs to the Demodulator 112. The Tuner 111 may receive both real time stream and non-real time stream. In the present invention, non-real time stream is referred to as NRT stream.

The Demodulator 112 receives digital IF signal of pass bandwidth inputted from the Tuner 111 and performs automatic gain control, reconstructs carrier frequencies and timing to convert into baseband signal and equalizes the channel. For example, if the broadcast signal is a VSB modulated signal, a VSB demodulation process is executed for automatic gain control, and reconstructs carrier frequencies and timing. In the Demodulator 112, demodulated and equalized channel data is outputted to the MPEG-2 TP Handler 121 in a MPEG-2 Transport Stream (TS) packet format.

The MPEG-2 TP Handler 121 is configured of an MPEG-2 TP Buffer and an MPEG-2 TP Parser, temporarily stores the Demodulator 112 output and then analyzes TS Header, and outputs to the Demultiplexer 123 if the Demodulator 112 output is a real time A/V TS packet or NRT TS packet and outputs to the PSI/PSIP Handler 122 if the output is a TS packet for PSI/PSIP table.

The PSI/PSIP Handler 122 is configured of a PSI/PSIP Section Buffer and a PSI/PSIP Parser, and temporarily stores the outputted TS packet from the MPEG-2 TP Handler 121 to reconstruct the corresponding table from PSI/PSIP Section data included in the payload of TS packet with referencing table identifier and then parse it. At this time, it is possible to find out whether one table is configured by one section or plurality of sections by the table_id field, section_number field, and last_section_number field within the corresponding section. Further, completing the corresponding table is possible by gathering sections having identical table identifiers. For example, it is possible to complete a VCT by gathering the sections having table identifiers allocated to VCT. Also, each of the parsed table information is collected by the Service Manager 160 and then stored in the first storage unit 180. The VCT, PAT, PMT, DST, EIT, ETT and the like, are stored in the first storage unit 180 after going through the process. The Service Manager 160 stores the table information in the first storage unit 180 in the Service Map & Guide DB format.

The Demultiplexer 123 divides audio TS packet and video TS packet and then outputs to the PES Decoder 131 if the TS packet is real time A/V TS packet and outputs to the DSM-CC Handler 135 if it is an NRT TS packet. Also, the Demultiplexer 123 outputs to the PCR Handler 133 if the TS packet includes Program Clock Reference (PCR) and outputs to the CAS 139 if the TS packet includes Conditional Access (CA) information. The NRT TS packet is divided into TS packet including NRT service data and TS packet including NRT service signaling channel. A unique PID is allocated to identify the NRT service in the TS packet of the NRT service data and the PID of the TS packet including the NRT service signaling channel is extracted using DST and PMT.

The Demultiplexer 123 outputs to the Descrambler 124 if the payload of the inputted TS packet is scrambled and the Descrambler 124 receives descrambling information needed for descrambling (for example, control word used in scrambling) from the CAS 139 and performs descrambling of the TS packet.

The Demultiplexer 123 stores A/V packet of real time like a PVR content from any one of the record, timed-record, or time shift request in the second storage unit 125. The second storage unit 125 is a mass storage device, an example of it can be a HDD. The download (storage) and upload (playing) in the second storage unit 125 is controlled by the PVR Manager 170 or the Service manager 160.

At this point, operator contents, such are managed by an operator (e.g., the service provider) may also be stored in the second storage unit 125. For this, the user may use a storage medium management screen, as shown in FIG. 18, to allocate a storage space for the operator contents within the storage space of the second storage unit 125. The operator contents correspond to targeted advertisements, announcements (or notices) provided by the service provider, and so on.

At this point, a minimum storage space for the operator contents is pre-decided in the second storage unit 125, and the user cannot allocate the storage space from the operator contents to a size smaller than the pre-decided minimum storage space (or minimum space). Since reference may be made to FIG. 18 for the description of the process of allocating the operator storage space, detailed description of the same will be omitted for simplicity.

Also, the NRT contents and the web contents according to the present invention may be stored in the second storage unit 125 or may be stored in the third storage unit 256. According to an embodiment of the present invention, the NRT contents and the web contents are stored in the third storage unit 256. In this case, the total storage space (e.g., 35 GB) shown in the storage medium management screen of FIG. 18 corresponds to the added sum of the storage space of the second storage unit 125 and the storage space of the third storage unit 256.

Meanwhile, the operator contents may also be stored in the third storage unit 256 instead of the second storage unit 125. At this point, the user may use the storage medium management screen of FIG. 18, so as to allocate a storage space for the operator contents within the storage space of the third storage unit 256. Similarly, a minimum storage space for the operator contents is pre-decided in the third storage unit 256, and the user cannot allocate the storage space from the operator contents to a size smaller than the pre-decided minimum storage space (or minimum space).

Also, when the storage space is managed from the storage medium management screen, the present invention may set-up a preference condition for each storage space. According to an embodiment of the present invention, the present invention may further display a Menu button for user preference configuration on a portion of the storage medium management screen of FIG. 18. FIG. 19 illustrates an exemplary user preference configuration screen, while the operator usage item is high-lighted.

In accordance with a playback request, the demultiplexer 123 separates an audio TS packet and a video TS packet from an A/V TS packet (i.e., PVR contents) uploaded from the second storage unit 125, thereby outputting the separated TS packets to a PES decoder 131.

The Demultiplexer 123, in order to perform such functions, is controlled by Service Manager 160 and/or PVR Manager 170.

Thus the Service Manager 160 receives DST by extracting the PID of the DST from the service location descriptor (or ES loop of PMT) of the VCT when the service_type field value indicates that NRT service is transmitted.

Further, NRT service is identified through the received DST, and extracts DST and PMT by using the PID of MPEG-2 TS including NRT service signaling channel. The extracted PID is outputted to the Demultiplexer 123. The Demultiplexer 123 outputs to the Addressable Section Handler 135 the MPEG-2 TS packets corresponding to PID outputted by the Service Manager 160.

The PCR is a standard time value used in syncing audio ES and video ES in the A/V Decoder 141. The PCR Handler 133 outputs to STC Handler 134 reconstructed PCR included in the payload of the inputted TS packet. The STC Handler 134 outputs to the A/V Decoder 141 reconstructed System Time Clock (STC) which is the standard clock from the system by the PCR.

The PES Decoder 131 is configured with a PES Buffer and a PES Handler, temporarily stores audio TS packet and video TS packet and removes TS header from each TS packet and reconstructs to audio PES and video PES. The reconstructed audio PES and video PES is outputted to the ES Decoder 132. The ES Decoder 132 is configured with an ES Buffer and an ES Handler, removes each PES header from audio PES and video PES and reconstructs audio ES and video ES which are pure data.

The A/V Decoder 141 uses each decoding algorithms to decode the audio ES and video ES and reconstructs to pre-compressed status and then outputs to the Presentation Manager 240. At this point, depending on the STC, the time sync is executed when audio ES and video ES are decoding. In one example, the audio decoding algorithm may apply at least one of AC-3 decoding algorithm, MPEG 2 audio decoding algorithm, HE AAC decoding algorithm, AAC SBR decoding algorithm, AAC+ decoding algorithm, HE AAC decoding algorithm, AAC SBR decoding algorithm, MPEG surround decoding algorithm, or BSAC decoding algorithm, and the video decoding algorithm may apply at least one of MPEG 2 video decoding algorithm, MPEG 4 video decoding algorithm, H.264 decoding algorithm, SVC decoding algorithm, and VC-1 decoding algorithm.

The CAS 139 is configured with a CA Stream Buffer and a CA Stream Handler, and the TS packet outputted from the MPEG-2 TP Handler 121 or the service protection data reconstructed and outputted from the UDP Datagram Handler 138 is temporarily stored and then reconstruct the needed information (control word used in scrambling) to descramble the stored TS packet or the service protected data. Thus, the CAS 139 acquires necessary information to descramble after extracting the Entitlement Management Message (EMM) and Entitlement Control Message (ECM) included in the payload of the TS packet, and then by analyzing the extracted EMM and ECM. The ECM may include the Control Word (CW) used in scrambling. The CW may be encrypted using the authentication key. The EMM may include authentication key of the corresponding data and the requirements information. The acquired information necessary for descrambling from the CAS 139 will be outputted to the Descramblers 124, 137.

The DSM-CC Section Handler 135 is configured with a DSM-CC Section Buffer and a DSM-CC Section Parser, temporarily stores the TS packet outputted from the Demultiplexer 123 and then reconstructs the addressable section included in the payload of the TS packet, and outputs to the IP Datagram Handler 136 after removing the header and the CRC checksum from the addressable section and then reconstructing the IP Datagram. The IP Datagram Handler 136 is configured with an IP Datagram Buffer and an IP Datagram Parser, and after buffering the IP datagram delivered from the DSM-CC Section Handler 135, extracts and analyzes the header of the buffered IP datagram and then outputs to the UDP Datagram Section Handler 138 after reconstructing the UDP datagram from the payload of the IP datagram.

At this point, if the IP datagram is scrambled, the scrambled UDP datagram is descrambled in the Descrambler 137 and then outputted to the UDP Datagram Handler 138. In one example, the Descrambler 137 gathers information needed for descrambling (for example, control words needed for scrambling) from the CAS 139 and descrambles the UDP datagram and then outputs to the UDP Datagram Handler 138.

The UDP Datagram Handler 138 is configured with UDP Datagram Buffer and UDP Datagram Parser, and after buffering the UDP datagram outputted from the IP Datagram Handler 136 or the Descrambler 137, extracts and analyzes the header of the buffered UDP datagram and reconstructs the data included in the payload of the UDP datagram. At this point, if the reconstructed data is service protection data then it is outputted to the CAS 139 and if it is NRT service signaling data, then it is outputted to the service signaling section handler 138-1, and if it is NRT service data then it is outputted to the ALC/LCT stream handler 151.

In an embodiment, the access information of the IP datagram transmitting NRT service signaling channel is a well-known destination IP address and well-known destination UDP port number.

Therefore, the IP Datagram Handler 136 and UDP Datagram Handler 138 has well-known destination IP multicast address and well-known destination UDP port number, and the IP multicast stream which transmits NRT service signaling channel, extracts the NRT service signaling data and outputs to the Service Signaling Section Handler 138-1.

Additionally, the service signaling section handler 138-1 is configured of a service signaling section buffer and a service signaling section parser. Herein, the service signaling section handler 138-1 recovers and parses NST, as shown in FIG. 10 and FIG. 11, and NRT-IT, as shown in FIG. 14 and FIG. 15, from the NRT service signaling data, thereby outputting the processed data to a service manager 160. When the NST is parsed, access information of a FLUTE session, which transmits contents/files configuring the NRT service, may be obtained. The information parsed from the NST and the NRT-IT is collected (or gathered) by the service manager 160, thereby being stored in the first storage unit 180. The service manager 160 stores the information extracted from the NST and the NRT-IT in the first storage unit 180 in the form of a service map and a service guide. According to another embodiment of the present invention, the function (or role) of the service manager 160 may be performed by an NRT service manager 210. More specifically, the information parsed from the NST and the NRT-IT may be collected (or gathered) by the NRT service manager 210, so as to be stored in the first storage unit 180.

Furthermore, when the user requests a service guide screen through a UI manager 250, the service manager 160 or the NRT service manager 210 displays an RT-specific service guide screen, as shown in FIG. 20, by using the information stored in the first storage unit 180, based upon the control of the operation controller 100. At this point, when the user uses an input means, such as a remote controller, a keyboard, a mouse, a touch pad, and so on, to select a "View previous program" at the upper portion of the RT-specific service guide screen, the RT-specific service guide screen is shifted to an NRT-specific service guide screen, as shown in FIG. 21. Herein, in order to return to the current broadcast, a "View current program" button is provided at the upper portion of the displayed NRT-specific service guide screen.

Even if the program available for "Play Now" and the program available for "Schedule Advance Recording" correspond to the same program, if the resolution of the two programs is different, the service manager 160 or the NRT service manager 210 displays (or indicates) resolution information of each program next to each program by using a text format or an icon, thereby enabling the user to recognize the difference in resolution and to select the preference program. At this point, if the program available for "Play Now" is a program being provided from a web server through an internet access (i.e., web contents), the internet access information of the program may be acquired through the above-described internet location descriptor, or may be acquired through content-location attributes of the corresponding files of the FLUTE FDT, which belongs to the content corresponding to the program. Also, when a codec, which is to be applied to a program that is to be downloaded via NRT or to a program that is already downloaded, does not exist, the service manager 160 or the NRT service manager 210 creates a message upon reference to the transmitted MIME-type encoding information and decoding parameters, thereby displaying the created message.

Thereafter, a program, content, and additional information being provided via NRT, and which are scheduled for downloading, are downloaded at a predetermined time through the FLUTE session. At this point, the downloaded program, content, and additional information pass through a file decoder 157 so as to be stored in the third storage unit 156, or the downloaded program, content, and additional information are displayed on the display screen through a presentation manager 240.

At this point, when the program, content, and additional information are being downloaded, the NRT service manager 210 may be able to notify the user whether downloading has not begun yet, or whether downloading is in progress, or whether downloading has been completed, by using letters, icons, colors, and so on, so that the user can be aware of the downloading status.

Meanwhile, when the user requests for a list of recordings, particularly a list of recordings related to the NRT contents, through the UI manager 250, based upon the control of the operation controller 110, the service manager 160 or the NRT service manager 210 uses the information stored in the first storage unit 180 so as to display the list of recordings screen, as shown in FIG. 25 or FIG. 26. At this point, in each list of recordings screen, the user may perform a function of sorting the contents by any one of the channel name, date of recording, content size, and content name. Also, the user may request detailed information on a specific content. FIG. 27 illustrates a detailed information screen being displayed, when detailed information on a specific content is requested by the user from the list of recordings screen of FIG. 25 or FIG. 26. Herein, since FIG. 25 to FIG. 27 have already been described in detail in the above description, detailed description of the same will be omitted for simplicity.

The ALC/LCT Stream Handler 151 is configured with an ALC/LCT Stream Buffer and an ALC/LCT Stream Parser and after buffering the ALC/LCT structure data outputted from the UDP Datagram Handler 138, analyzes the header and the header extension of the ALC/LCT session buffered from the data. After analyzing the header and the header extension of the ALC/LCT session, if the data transmitted through ALC/LCT session is in XML structure then it is outputted to the XML Parser 153, and if the data is in file structure, it is temporarily stored in the File Reconstruction Buffer 152 and outputted to the File Decoder 157 or stored in the third storage unit 156. If the data transmitted through ALC/LCT session is data for NRT service, the ALC/LCT stream handler 151 gets controlled by the NRT service manager 210. If the data transmitted through ALC/LCT session is compressed, the Decompressor 155 decompresses and outputted to the XML Parser 153, the File Decoder 157, or the third storage unit 156.

The XML Parser 153 analyzes the XML data transmitted through ALC/LCT session and if the analyzed data is filed-based service then it is outputted to the FDT Handler 154 and if it is a data for service guide, then it is outputted to the SG Handler 190.

The FDT Handler 154 analyzes and processes the File Description Table of the FLUTE protocol through the ALC/LCT session. The FDT Handler 154 is controlled by the NRT Service Manager 210 if the received file is for the NRT service.

The SG Handler 190 gathers and analyzes the data for the service guide transmitted in XML structure, and then outputs to the EPG Manager 200.

The File Decoder 157 decodes the file outputted from the File Reconstruction Buffer 152, file outputted from the Decompressor 155, or filed uploaded from the third storage unit 156 using the pre-selected algorithm and outputs to the Middleware (M/W) Engine 230 or to the A/V Decoder 141.

The M/W Engine 230 interprets and executes the application, which is the data of the file structure. Further, through the Presentation Manager 240, the application may be outputted to an output device such as a screen or a speaker. In an embodiment, the M/W Engine 230 is a JAVA platform based M/W Engine.

The EPG Manager 200, depending upon the input from the user, outputs the service guide data after converting into a display format received from the SG Handler 190 to the Presentation Manager 240. The Application Manager 220 manages the handling of the application data received in a file format.

The Service Manager 160 gathers and analyzes the NRT service signaling data transmitted through the NRT service signaling channel or the PSI/PSIP table data and creates a service map and the stores in the second storage unit 125. The Service Manager 160 controls the access information of the NRT service that the user wants and controls the Tuner 111, Demodulator 112, and the IP Datagram Handler 136.

The Operation Controller 100 according to the command from the user through the UI Manager 250, controls at least one of the Service Manager 160, the PVR Manager 170, the EPG Manager 200, the NRT Service Manager 210, the Application Manager 220, and the Presentation Manager 240, and executes the user's command.

The NRT Service Manager 210 manages the NRT Service transmitted in content/file format through the FLUTE session on the IP layer.

The UI Manager 250 delivers the user's input through the UI to the Operation Controller 100.

The Presentation Manager 240 provides the user through a speaker and/or a screen at least one of the audio and video data outputted from the A/V Decoder 141, file data outputted from the M/W Engine 230, or service guide data outputted from the EPG Manager 210.

As described above, according to the embodiment of the present invention, since an RT-specific service guide screen may be easily shifted to an NRT-specific service guide screen, or since an NRT-specific service guide screen may be easily shifted to an RT-specific service guide screen, the user may be able to conveniently use the NRT service and the RT service. Also, by providing a storage medium management screen that can modify the storage space, the present invention allows the user to easily allocate and modify the storage space for the operator contents. Furthermore, by providing a function of sorting contents by at least one of content name, channel name, date of recording, and content size in the list of recordings screen, which includes the contents stored in the storage medium, the user can easily recognize the contents stored in the storage medium.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of transmitting a broadcast signal for non-real time service, the method comprising:
generating the broadcast signal having the non-real time service, signaling data for signaling the non-real time service and file delivery table providing a means to describe attributes for files associated with a non-real time content in the non-real time service,
wherein the signaling data includes a service map table containing service-level attributes for the non-real time service and a non-real time information table containing information describing content items available for download to storage in a broadcast receiving device, the service map table including information used as a linkage to a non-real time information table, the non-real time information table includes content linkage information used to link metadata in the non-real time information table to at least one file described in the file delivery table associated with the non-real time content; and
transmitting the non-real time service via a broadcast channel, the signaling data via a service signaling channel with a specific Internet Protocol (IP) address and user datagram protocol (UDP) port number, and the file delivery table via an Asynchronous Layered Coding/Layered Coding Transport (ALC/LCT) session,
wherein the non-real time information table includes an availability indicator indicating whether the files associated with the non-real time content are available over an interaction channel, and the file delivery table further includes content location information specifying uniform resource locator (URL) for each of the files when the availability indicator indicates the files are available over the interaction channel,
wherein the non-real time information table further includes expiration information representing expiration time of the non-real time content for guiding the broadcast receiving device to delete the non-real time content stored in the storage of the broadcast receiving device.

2. The method of claim 1, wherein the non-real time service is delivered within IP packets, the IP packets associated with a virtual channel are identified by references in a Virtual Channel Table (VCT) and an associated Program Map Table (PMT) table, wherein the IP packets are carried in a Moving Picture Experts Group-2 (MPEG-2) Transport Stream using digital storage media command and control (DSM-CC) Addressable Sections.

3. The method of claim 2, wherein the service signaling channel is carried in a portion of the IP packets.

4. The method of claim 1, wherein the non-real time information table further includes expiration information indicator indicating whether the expiration information is present for the non-real time content.

5. The method of claim 2, wherein the PMT has elementary packet identifier for linking to at least one of the DSM-CC addressable sections.

6. An apparatus for receiving a broadcast signal for non-real time service, the apparatus comprising:
a tuner configured to receive the broadcast signal having the non-real time service, signaling data for signaling the non-real time service and file delivery table providing a means to describe attributes for files associated with a non-real time content in the non-real time service,
wherein the signaling data includes a service map table containing service-level attributes for the non-real time service and a non-real time information table containing information describing content items available for download to storage in a broadcast receiving device, the service map table including information used as a linkage to a non-real time information table, the non-real time information table includes content linkage information used to link metadata in the non-real time information table to at least one file described in the file delivery table associated with the non-real time content; and
a storage configured to store the at least one file associated with the non-real time content;
wherein the non-real time service is received via a broadcast channel, the signaling data is received via a service signaling channel with a specific Internet Protocol (IP) address and user datagram protocol (UDP) port number, and the file delivery table is received via an Asynchronous Layered Coding/Layered Coding Transport (ALC/LCT) session, wherein the non-real time information table includes an availability indicator indicating whether the files associated with the non-real time content are available over an interaction channel, and the file delivery table further includes content location information specifying uniform resource locator (URL) for each of the files when the availability indicator indicates the files are available over the interaction channel, wherein the non-real time information table further includes expiration information representing expiration time of the non-real time content for guiding the broadcast receiving device to delete the non-real time content stored in the storage of the broadcast receiving device.

7. The apparatus of claim 6, wherein the non-real time service is delivered within IP packets, the IP packets associated with a virtual channel are identified by references in a Virtual Channel Table (VCT) and an associated Program Map Table (PMT) table, wherein the IP packets are carried in the a Moving Picture Experts Group-2 (MPEG-2) Transport Stream using digital storage media command and control (DSM-CC) Addressable Sections.

8. The apparatus of claim 7, wherein the service signaling channel is carried in a portion of the IP packets.

9. The apparatus of claim 6, wherein the non-real time information table further includes expiration information indicator indicating whether the expiration information is present for the non-real time content.

10. The apparatus of claim 7, wherein the PMT has elementary packet identifier for linking to at least one of the DSM-CC addressable sections.

* * * * *